(12) United States Patent
Kang

(10) Patent No.: US 11,470,833 B2
(45) Date of Patent: Oct. 18, 2022

(54) AUTOMATIC AGRICULTURAL EQUIPMENT AND AUTOMATIC MOVING SYSTEM

(71) Applicant: Myoung Soo Kang, Seogwipo-si (KR)

(72) Inventor: Myoung Soo Kang, Seogwipo-si (KR)

( * ) Notice: Subject to any disclaimer, the term of this patent is extended or adjusted under 35 U.S.C. 154(b) by 172 days.

(21) Appl. No.: 16/958,686

(22) PCT Filed: Dec. 28, 2018

(86) PCT No.: PCT/KR2018/016935
§ 371 (c)(1),
(2) Date: Jun. 27, 2020

(87) PCT Pub. No.: WO2019/132623
PCT Pub. Date: Jul. 4, 2019

(65) Prior Publication Data
US 2020/0337290 A1 Oct. 29, 2020

(30) Foreign Application Priority Data
Dec. 28, 2017 (KR) .................. 10-2017-0182319

(51) Int. Cl.
*A01M 7/00* (2006.01)
*B05B 15/628* (2018.01)
(Continued)

(52) U.S. Cl.
CPC .......... *A01M 7/005* (2013.01); *B05B 15/628* (2018.02); *B05B 15/68* (2018.02); *B05B 15/70* (2018.02)

(58) Field of Classification Search
CPC ...... A01M 7/005; B05B 15/628; B05B 15/68; B05B 15/70
(Continued)

(56) References Cited

U.S. PATENT DOCUMENTS 4,805,648 A * 2/1989 Hour ................ A61L 2/18
239/752
4,913,357 A * 4/1990 Bolyard .............. B60S 3/04
239/751
(Continued)

FOREIGN PATENT DOCUMENTS

KR 2020100010342 U 10/2010
KR 1020150085265 A 7/2015
(Continued)

OTHER PUBLICATIONS

International Search Report (in English and Korean) and Written Opinion of the ISA (in Korean) issued in PCT/KR2018/016935, dated Apr. 4, 2019; ISA/KR.

*Primary Examiner* — Steven J Ganey
(74) *Attorney, Agent, or Firm* — Harness, Dickey & Pierce, P.L.C.

(57) ABSTRACT

An automatic agricultural machine according to the present invention includes: a fixed base disposed on farmland; a first-direction movement guide part installed on the fixed base so as to be spaced apart from the farmland; a first-direction movement trolley configured to travel on the first-direction movement guide part; and an automatic spraying device configured to travel on a second-direction movement guide part connected to the first-direction movement trolley, wherein traveling control of the first-direction movement trolley and winding control of the second-direction movement guide part are performed on the basis of at least any one of the trigonometric function principle and the Pythagorean theorem.

7 Claims, 27 Drawing Sheets

(51) Int. Cl.
*B05B 15/68* (2018.01)
*B05B 15/70* (2018.01)

(58) Field of Classification Search
USPC .......................................... 239/69, 750–752
See application file for complete search history.

(56) References Cited

U.S. PATENT DOCUMENTS

| | | | | |
|---|---|---|---|---|
| 6,394,370 | B1* | 5/2002 | Payne | ................ B60S 3/04 |
| | | | | 239/752 |
| 2015/0108319 | A1 | 4/2015 | Duncan et al. | |
| 2016/0270372 | A1 | 9/2016 | Kruijff et al. | |

FOREIGN PATENT DOCUMENTS

| | | |
|---|---|---|
| KR | 101670731 B1 | 10/2016 |
| KR | 101778076 B1 | 9/2017 |

* cited by examiner

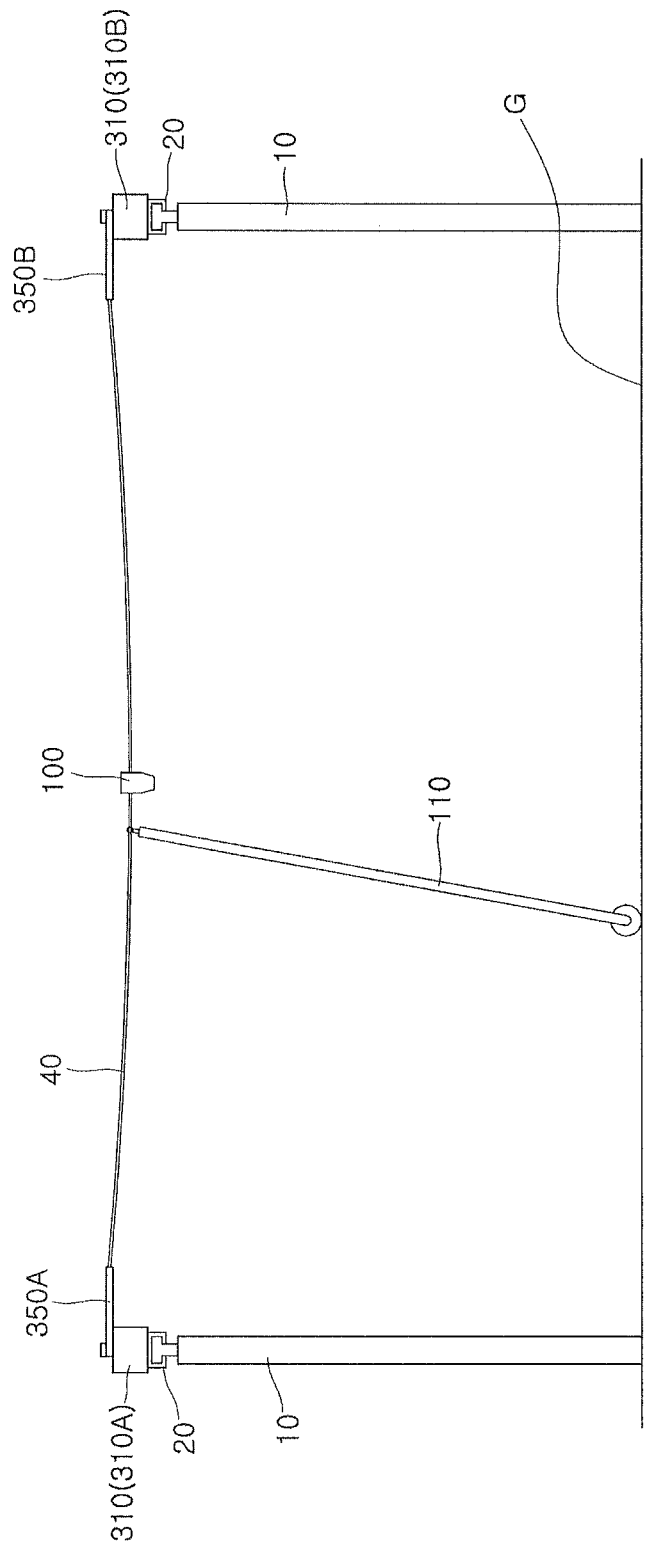

[FIG. 9]
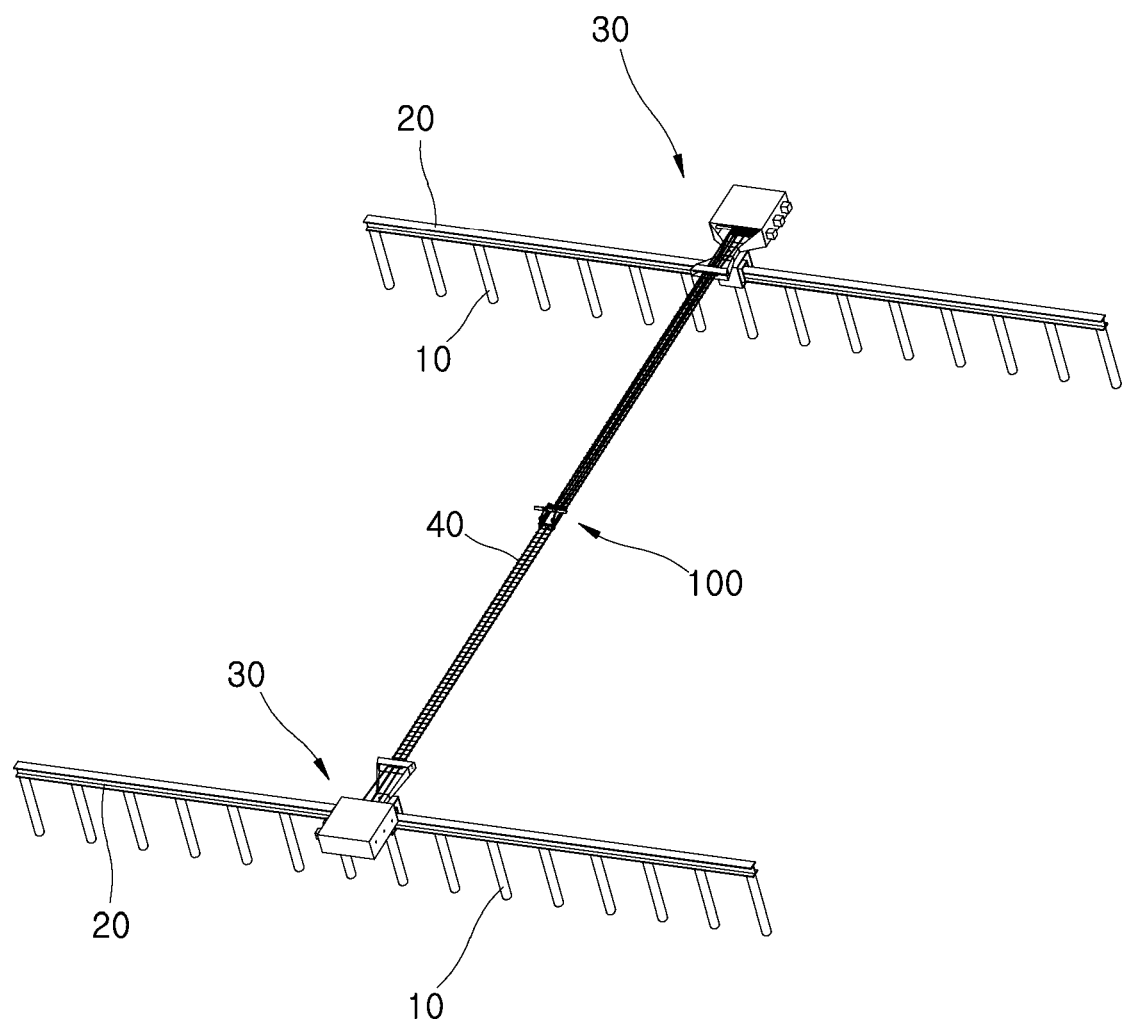

[FIG. 10]
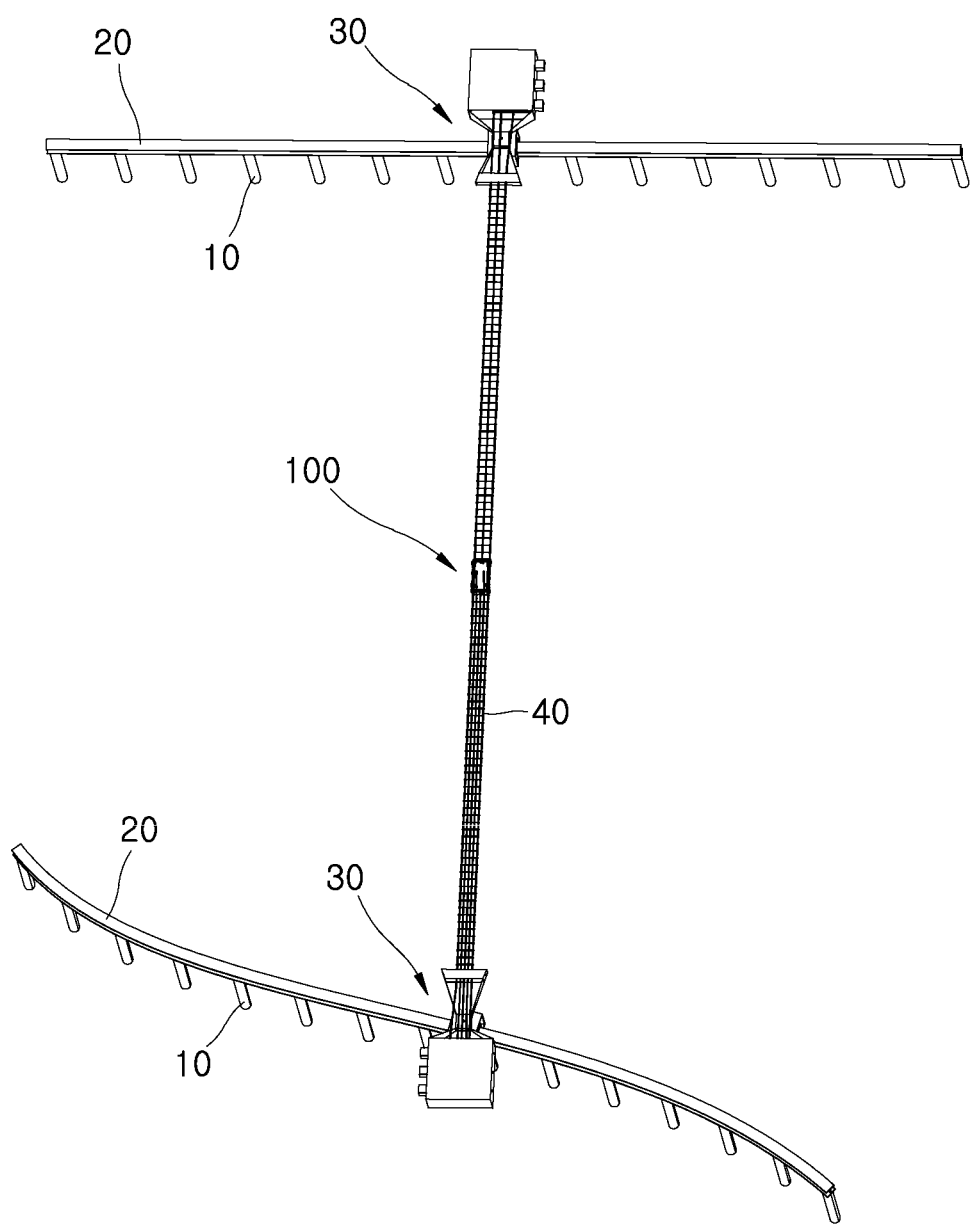

[FIG. 11]
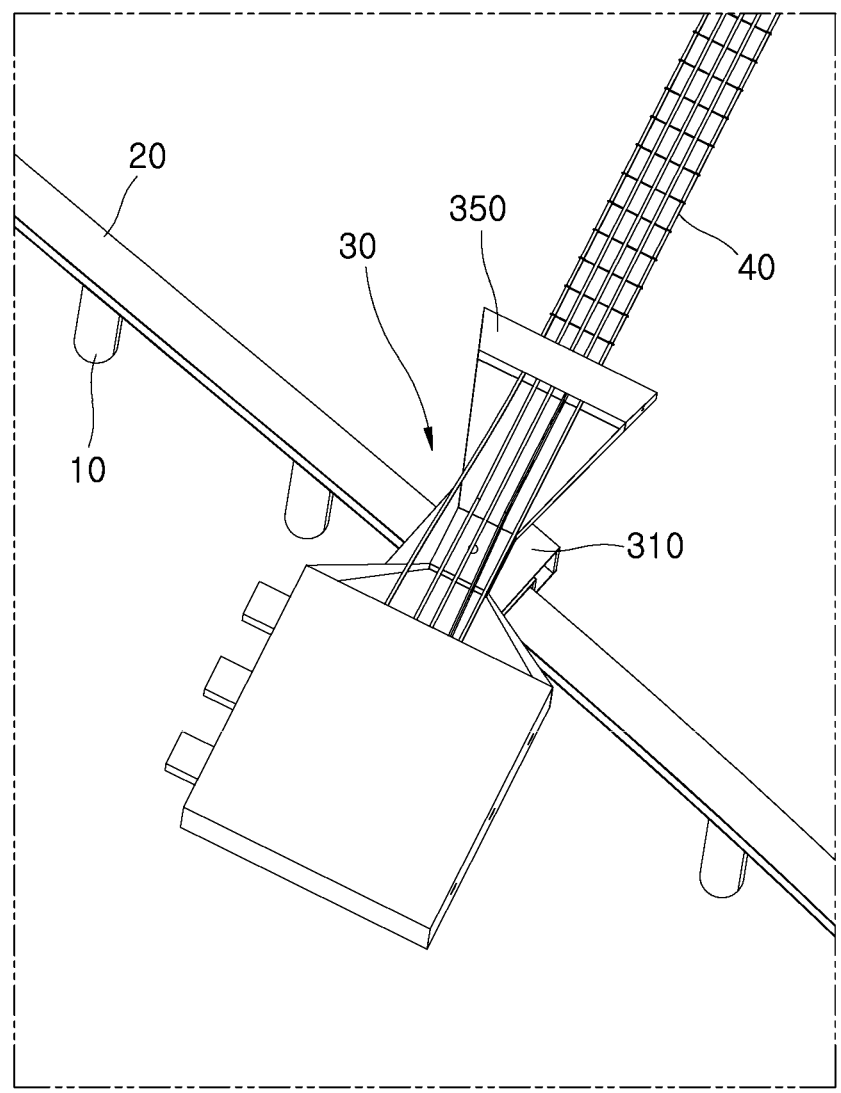

[FIG. 12]
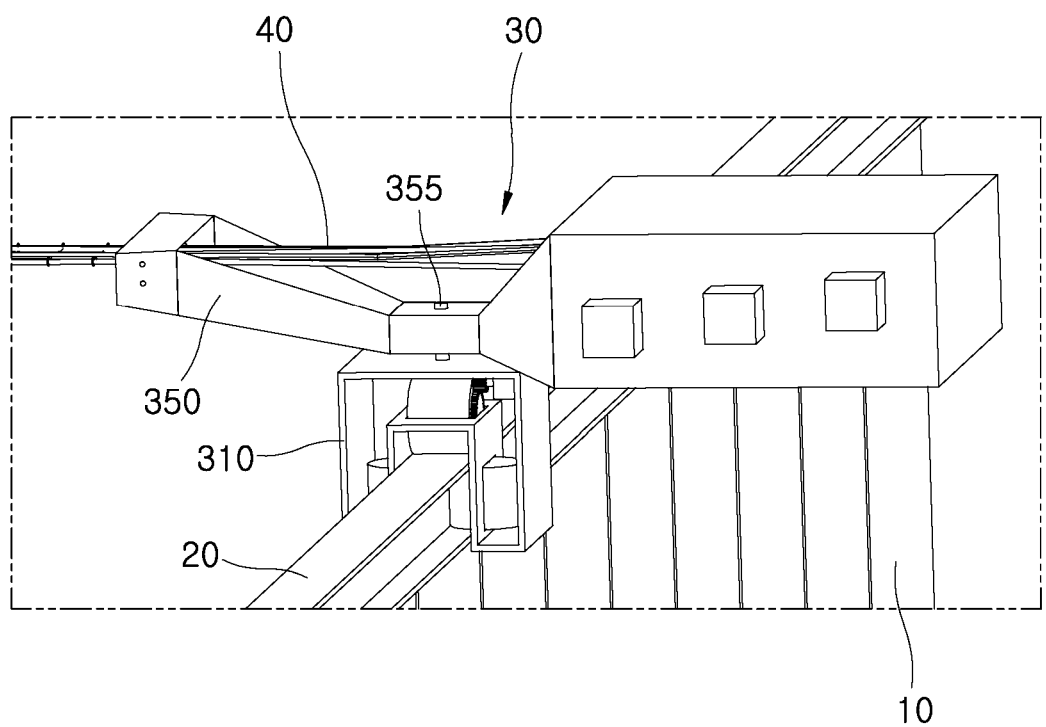

[FIG. 13]
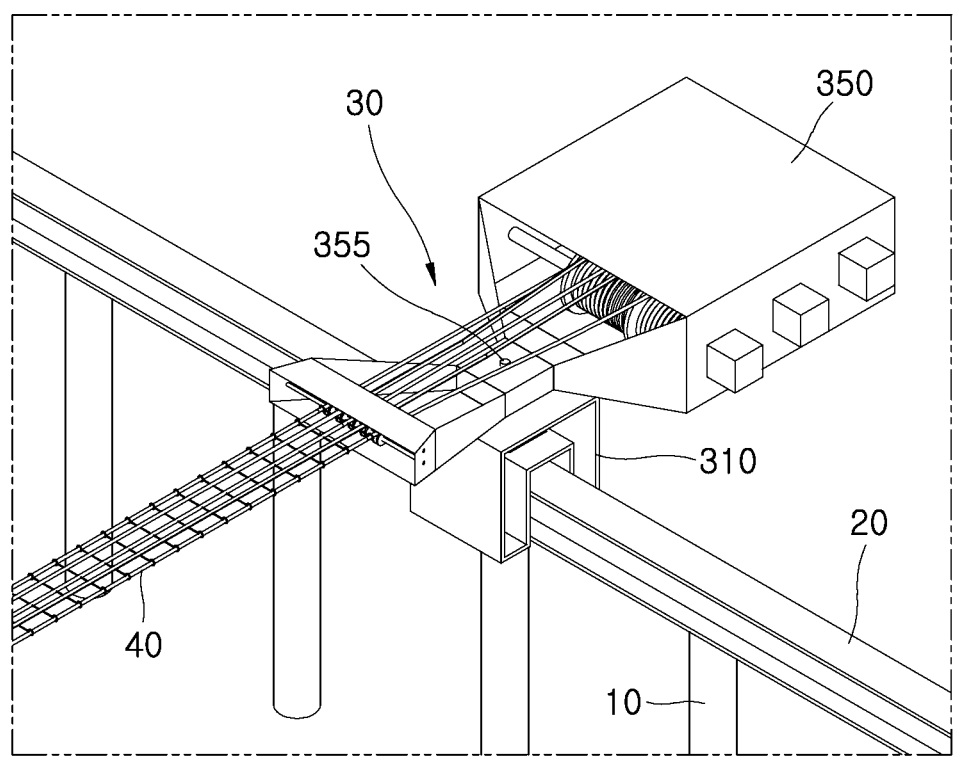

[FIG. 14]
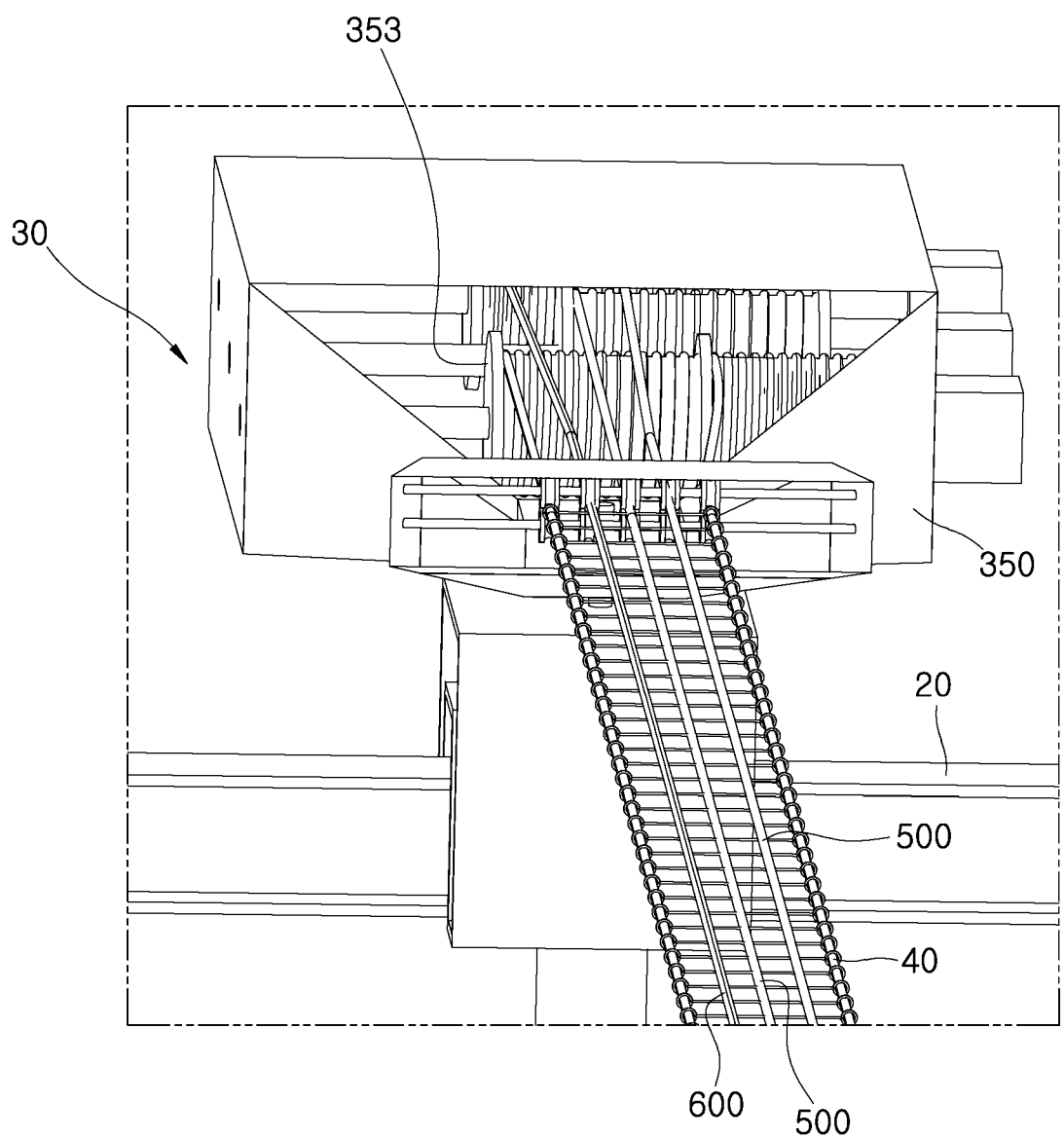

[FIG. 15]
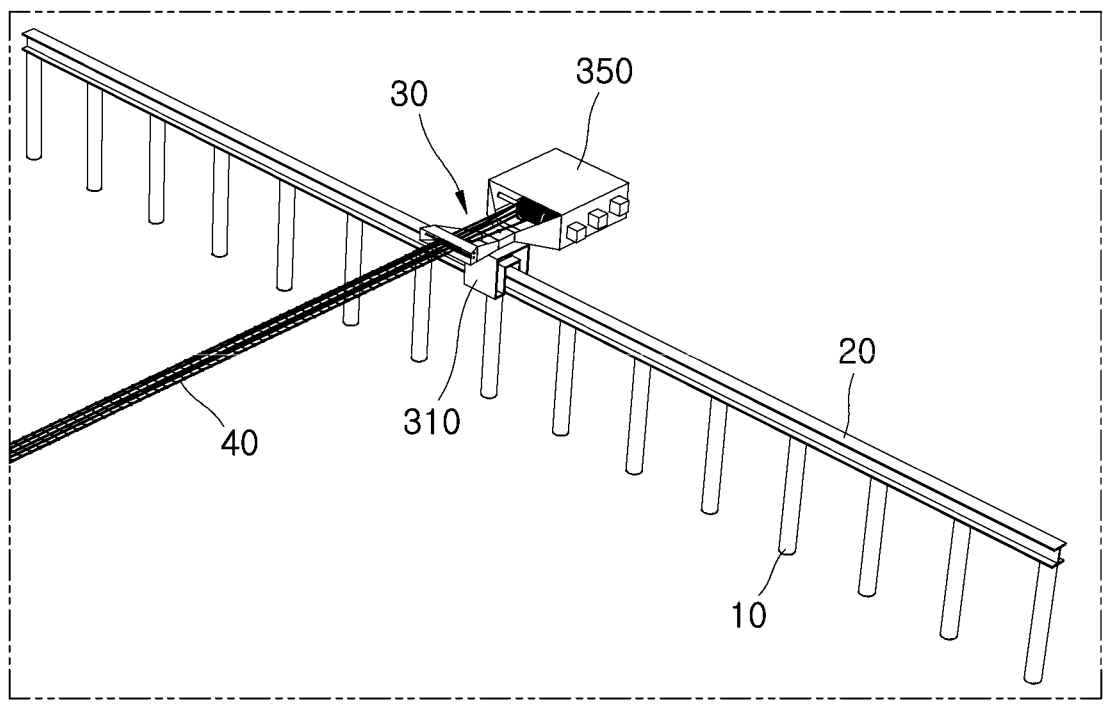

[FIG. 16]
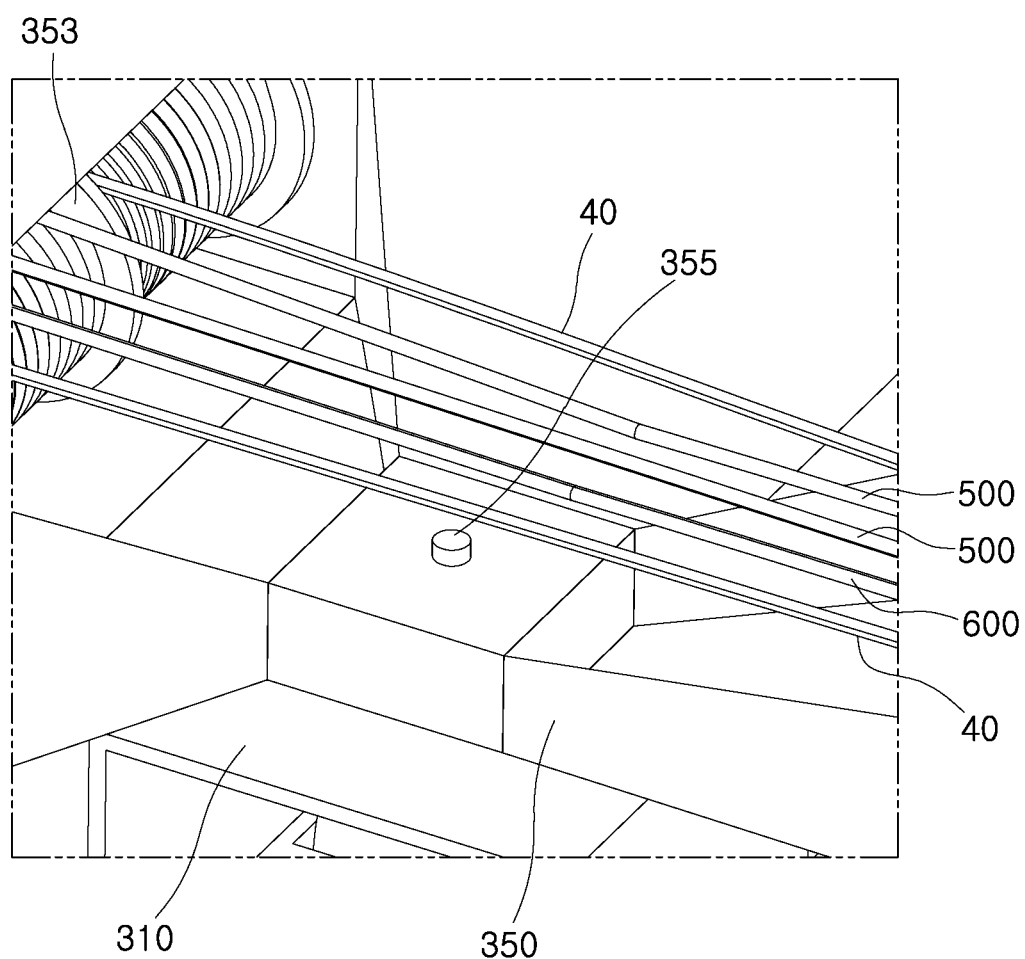

[FIG. 17]
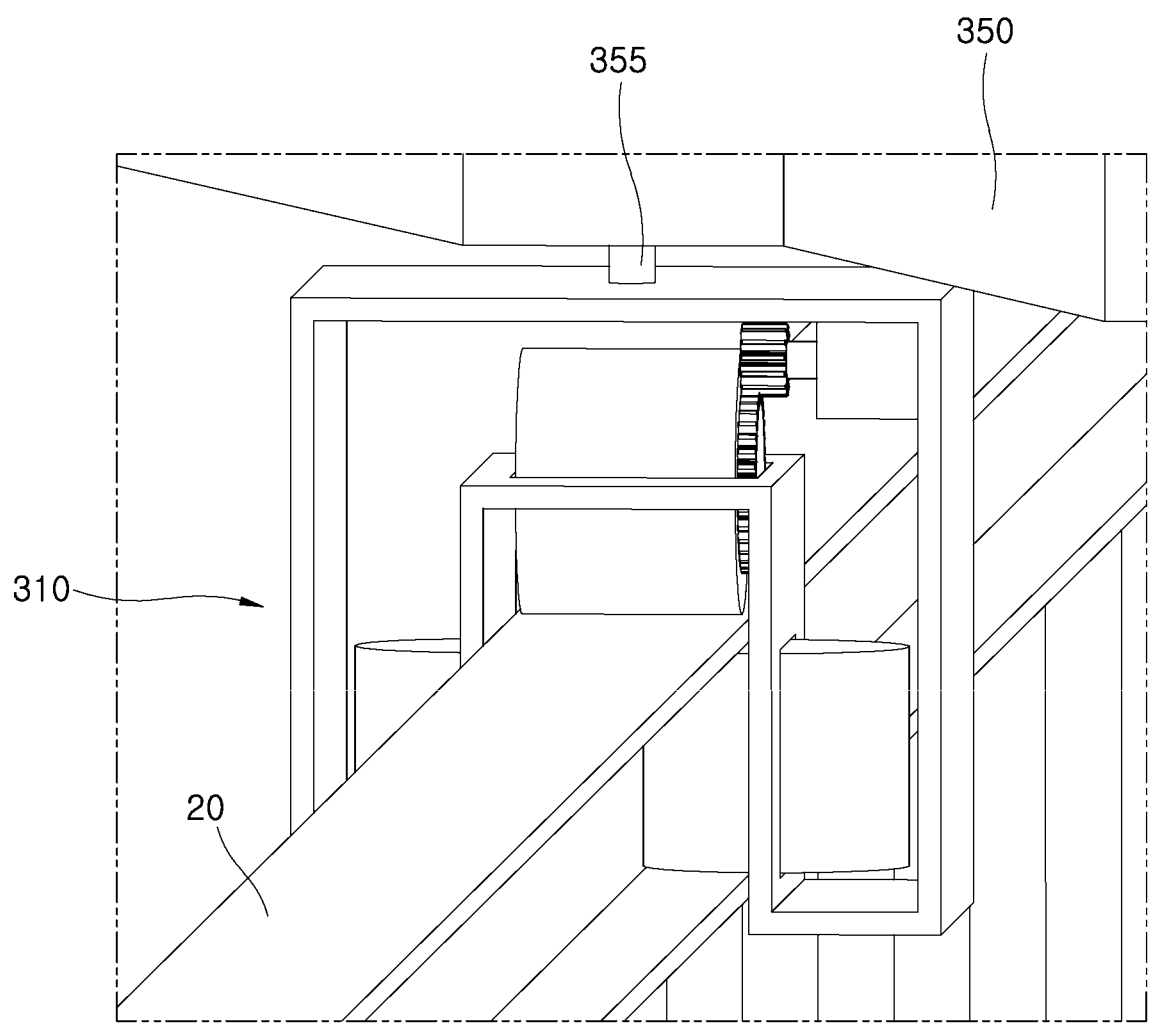

[FIG. 18]
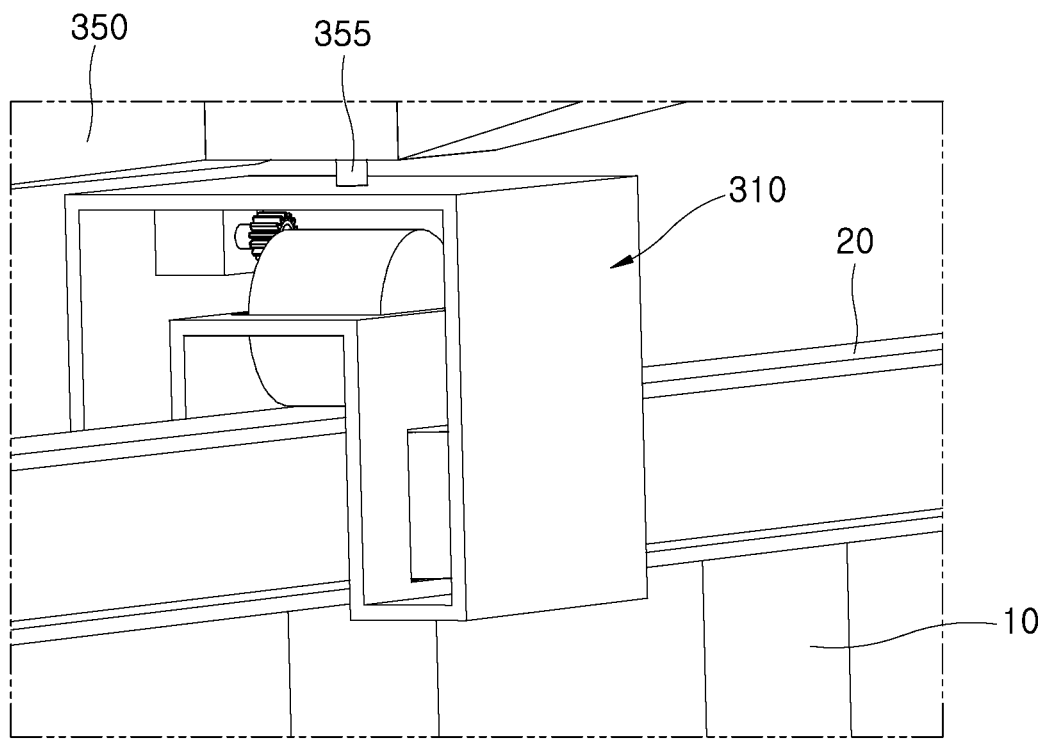

[FIG. 19]
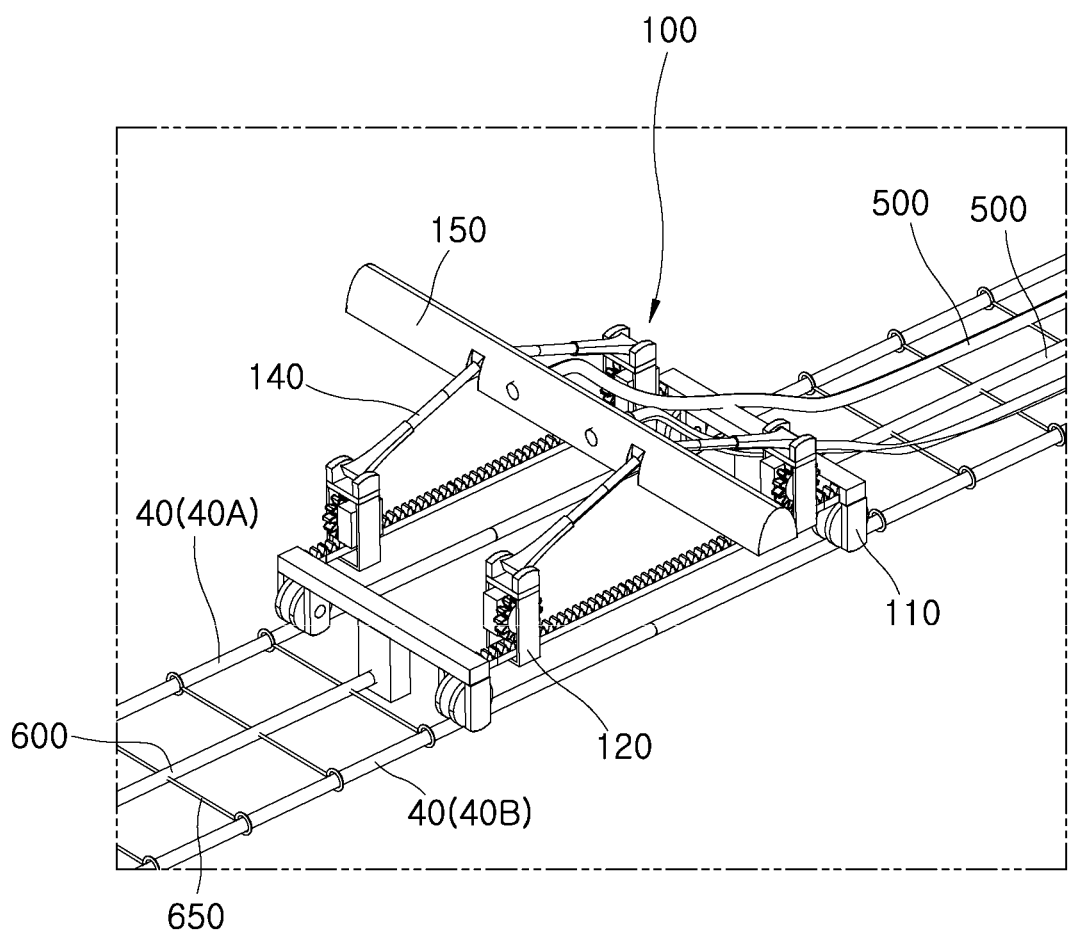

[FIG. 20]
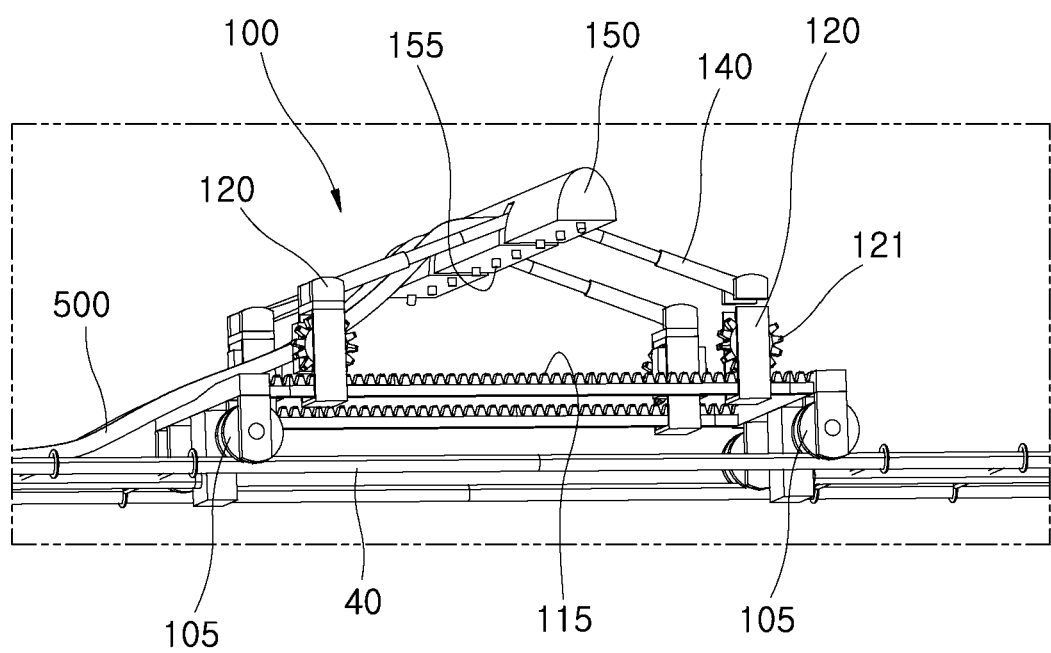

[FIG. 21]
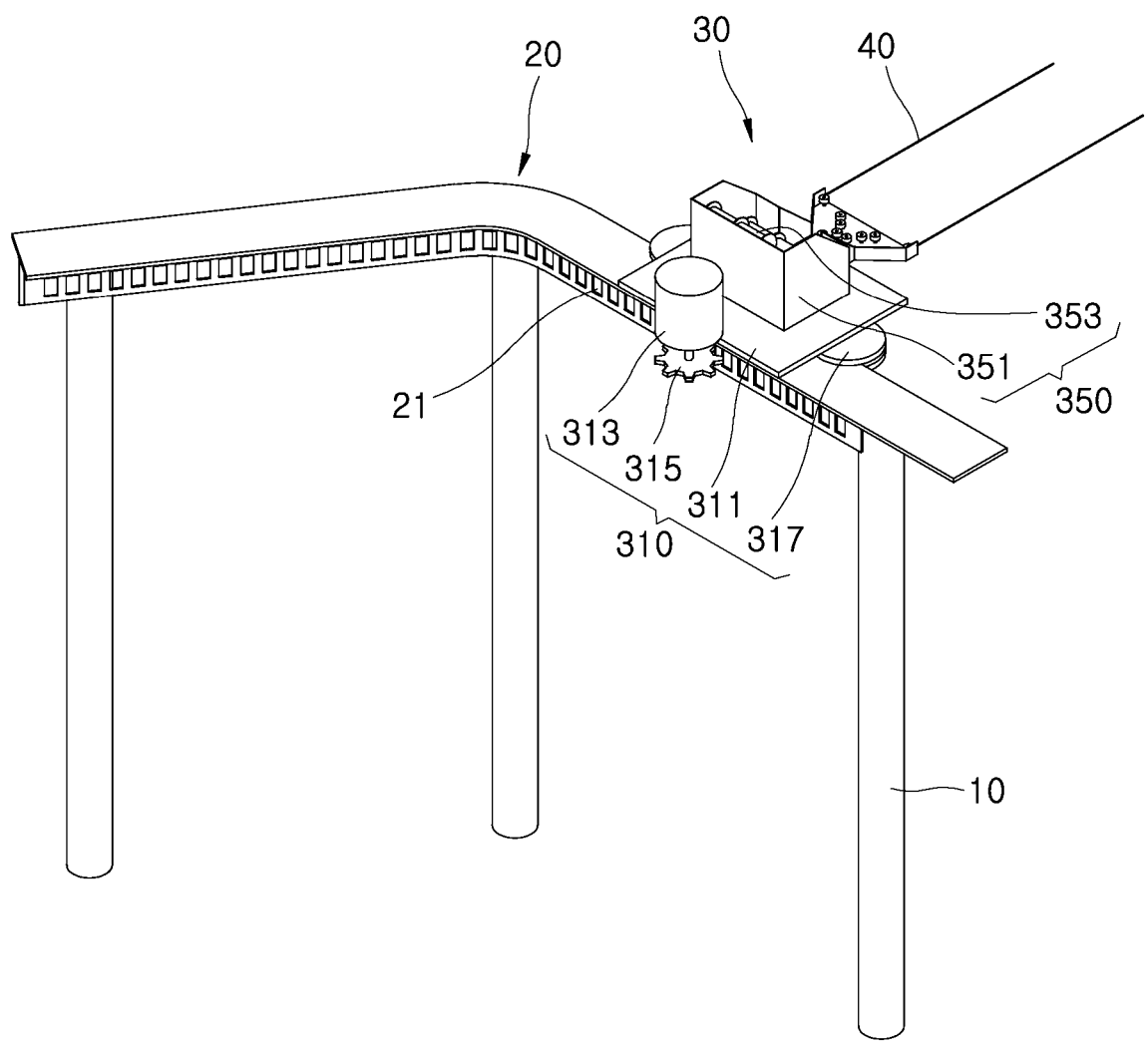

[FIG. 22]
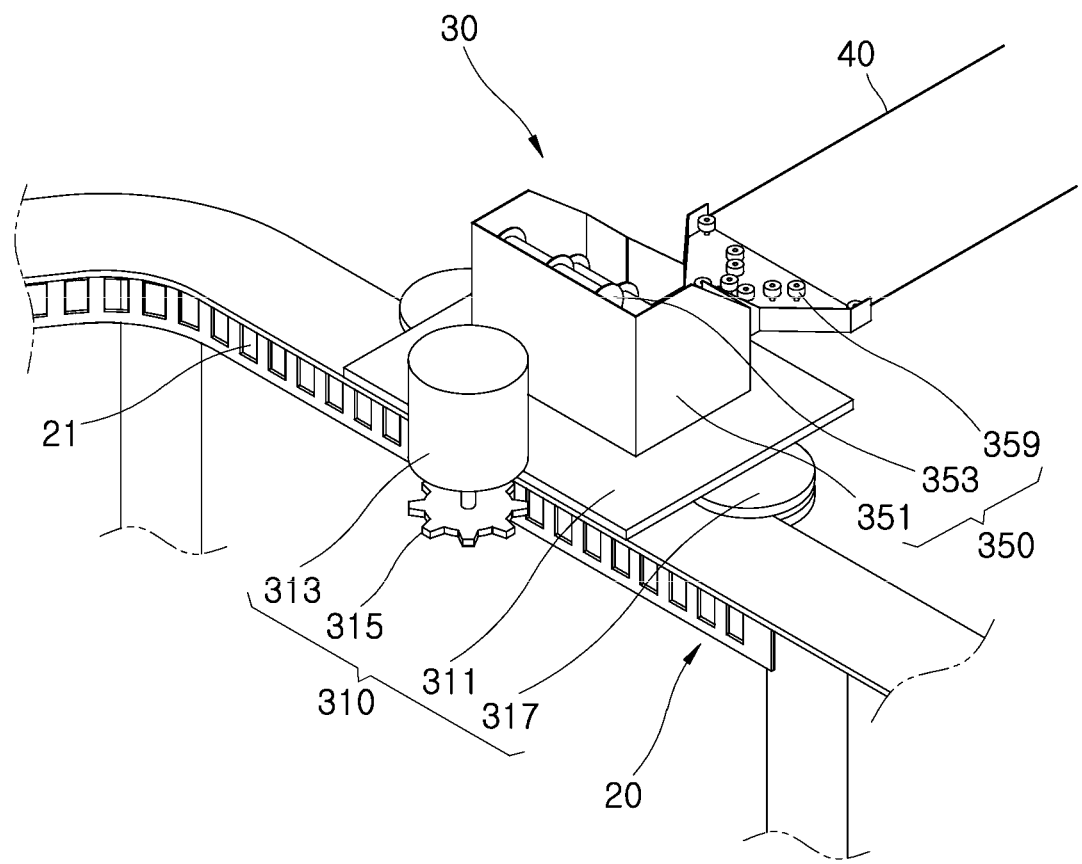

[FIG. 23]
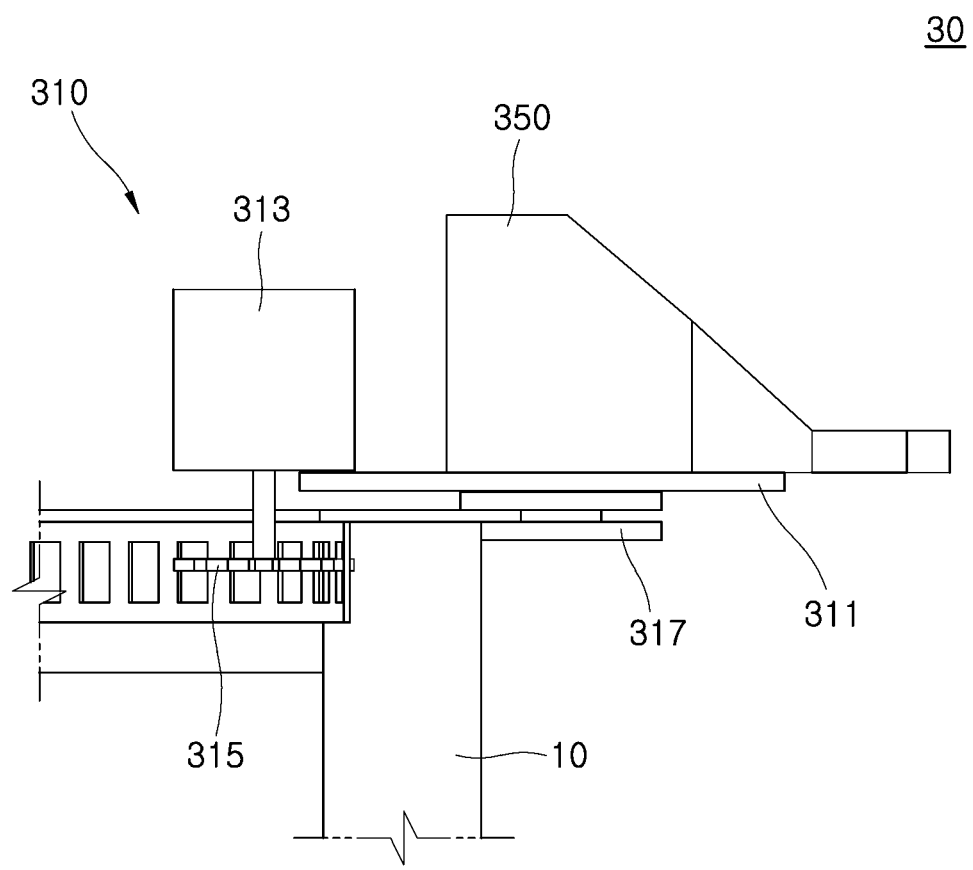

[FIG. 24]
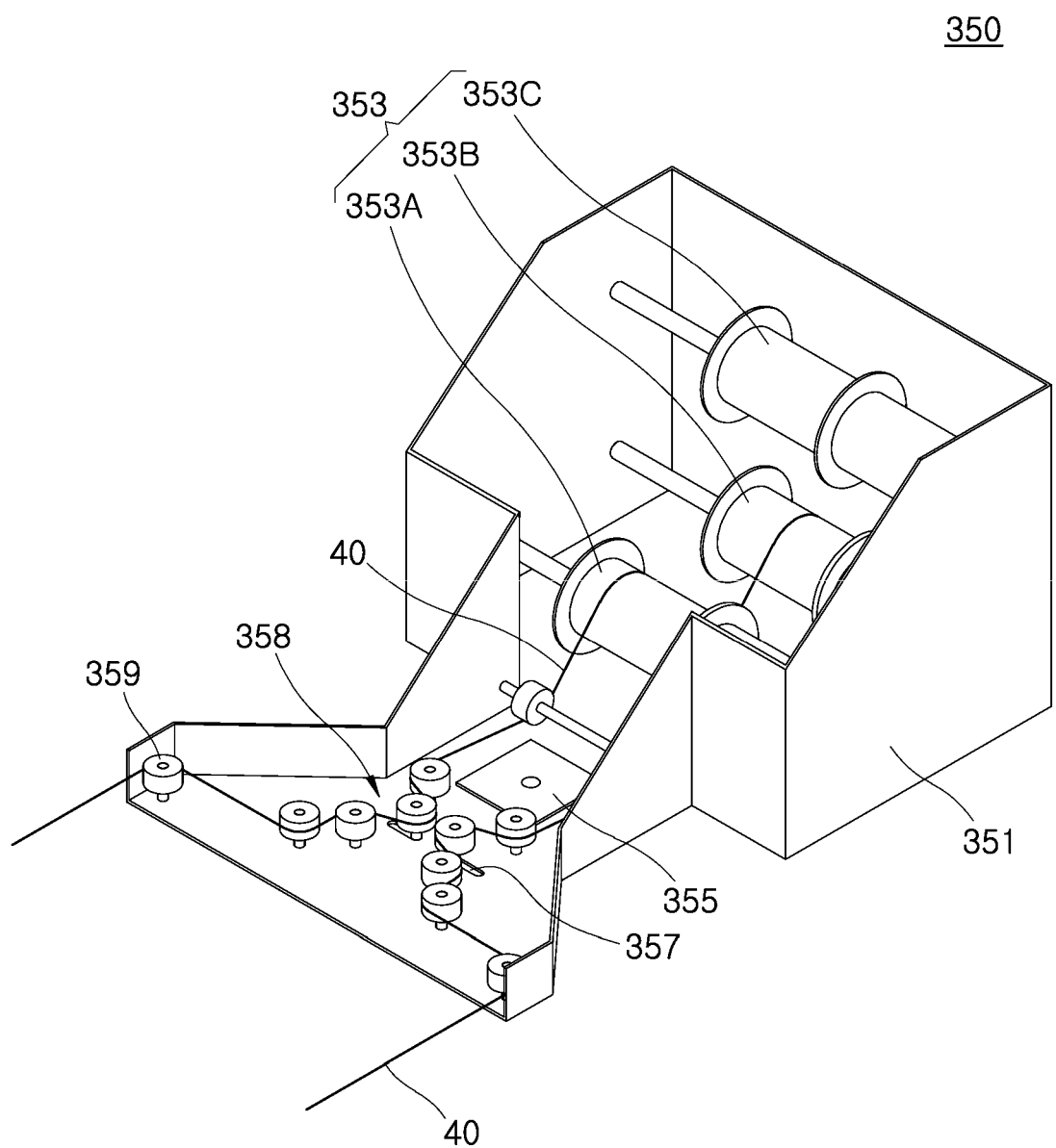

[FIG. 25]
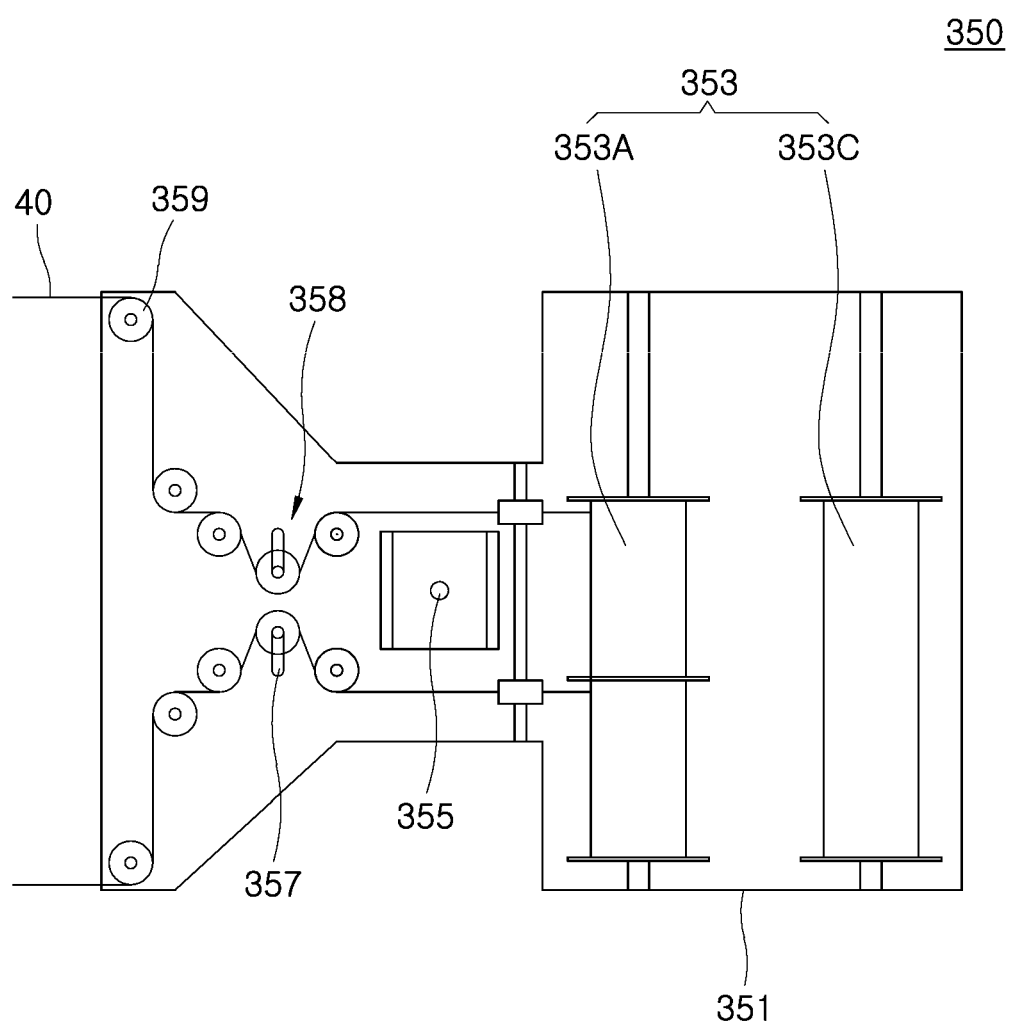

[FIG. 26]
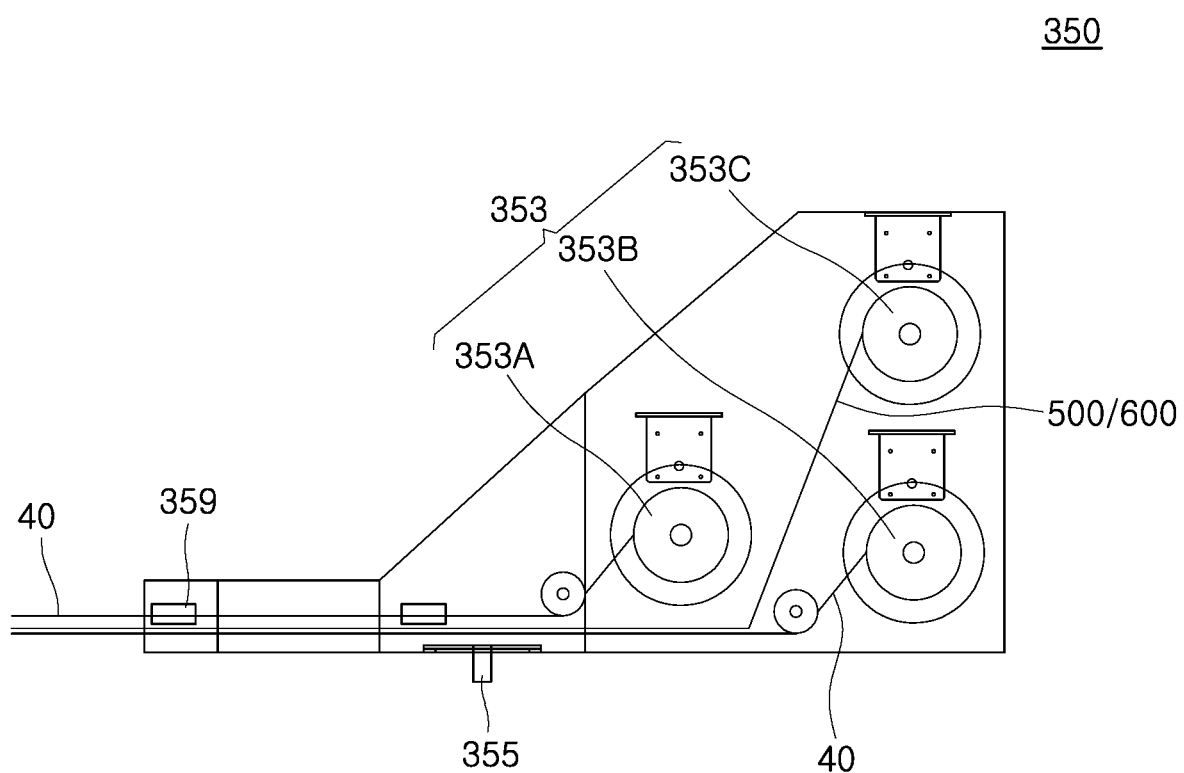

[FIG. 27]
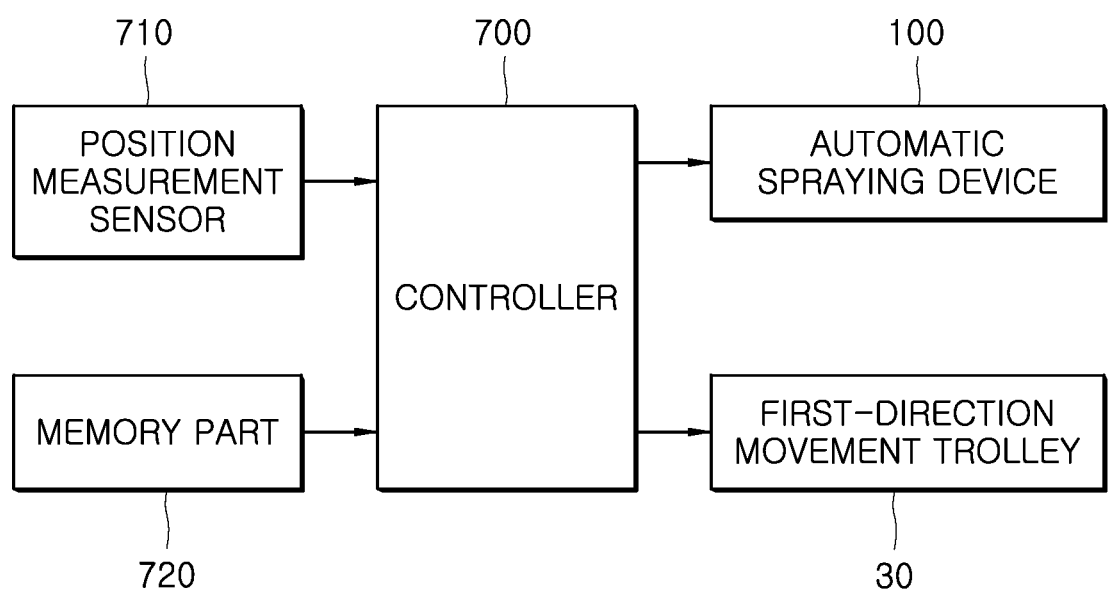

AUTOMATIC AGRICULTURAL EQUIPMENT AND AUTOMATIC MOVING SYSTEM

CROSS-REFERENCE TO RELATED APPLICATIONS

This application is a 371 U.S. National Phase of International Application No. PCT/KR2018/016935, filed Dec. 28, 2018, which claims priority to Korean Patent Application No. 10-2017-0182319, filed Dec. 28, 2017. The entire disclosures of the above applications are incorporated herein by reference.

TECHNICAL FIELD

The present invention relates to an automatic agricultural machine, and more particularly, to an automatic agricultural machine that allows a worker to automatically spray pesticides and the like onto crops. In addition, the present invention relates to an automatic movement system capable of automatically moving on a target area including an irregular area.

BACKGROUND ART

Generally, pesticides which have been developed to improve the production of crops are sprayed on target objects such as crops. In order to spray pesticides, pesticides are diluted with water and then stored in a tank. Then, a worker carries the tank holding the pesticides therein on his or her back and sprays the pesticides on target objects by operating an artificial pump with one hand and holding a sprayer with the other hand.

In addition, a pesticide spraying method using a sprinkler has disadvantages in that equipment maintenance cost is high, a high level of manpower is required, and a large amount of water is wasted. Further, the pesticide spraying method using a sprinkler has problems in that a pathogen transmission rate increases, a sprinkler device is frequently damaged due to agricultural equipment, and the shelf life of pesticides decreases due to the microbial decay of the pesticides. Also, a pesticide spraying method using an unmanned helicopter or the like has problems in that it is difficult to spray the pesticides uniformly due to thrust, an operation time of the unmanned helicopter or the like is short, and piloting the unmanned helicopter or the like is difficult.

The related art of the present invention has been disclosed in Korean Patent Registration No. 10-1778076 (Date of Registration: Sep. 7, 2017, Title of Invention: Pesticide spraying device).

DISCLOSURE

Technical Problem

The present invention is directed to providing an automatic agricultural machine that allows a worker to automatically spray pesticides and the like onto crops.

The present invention is also directed to providing an automatic agricultural machine capable of spraying pesticides uniformly throughout crops.

The present invention is also directed to providing an automatic agricultural machine capable of eradicating pests that live in farmland.

The present invention is also directed to providing an automatic agricultural machine capable of detecting the growth of crops and other environmental changes in farmland in real time.

Technical Solution

An automatic agricultural machine according to the present invention includes: a fixed base disposed on farmland; a first-direction movement guide part installed on the fixed base so as to be spaced apart from the farmland; a first-direction movement trolley configured to travel on the first-direction movement guide part; and an automatic spraying device configured to travel on a second-direction movement guide part connected to the first-direction movement trolley, wherein traveling control of the first-direction movement trolley and winding control of the second-direction movement guide part are performed on the basis of at least any one of the trigonometric function principle and the Pythagorean theorem.

The automatic agricultural machine according to the present invention may spray pesticides uniformly throughout crops.

The automatic agricultural machine according to the present invention may eradicate pests that live in farmland.

The automatic agricultural machine according to the present invention may detect the growth of crops and other environmental changes in farmland in real time.

Advantageous Effects

An automatic agricultural machine according to the present invention can allow a worker to automatically spray pesticides and the like onto crops, can eradicate pests that live in farmland, and can detect the growth of crops and other environmental changes in farmland in real time.

DESCRIPTION OF DRAWINGS

FIG. 8 is a front view illustrating an operational state of the automatic agricultural machine according to an embodiment of the present invention.

FIGS. 9 and 10 are perspective views illustrating an automatic agricultural machine according to an embodiment of the present invention.

FIG. 11 is a schematic plan view of a first-direction movement trolley according to an embodiment of the present invention.

FIG. 12 is a schematic side view of the first-direction movement trolley according to an embodiment of the present invention.

FIG. 13 is a schematic perspective view of a first-direction movement trolley according to an embodiment of the present invention.

FIG. 14 is a schematic front view of the first-direction movement trolley according to an embodiment of the present invention.

FIG. 15 is a schematic remote perspective view of the first-direction movement trolley according to an embodiment of the present invention.

FIG. 16 is an enlarged view of a rotating shaft portion of the first-direction movement trolley according to an embodiment of the present invention.

FIGS. 17 and 18 are enlarged views of a first-direction movement main body portion of the first-direction movement trolley according to an embodiment of the present invention.

FIGS. 19 and 20 are views illustrating an automatic spraying unit according to an embodiment of the present invention.

FIGS. 21 and 22 are schematic perspective views of a first-direction movement trolley of an automatic agricultural machine according to another embodiment of the present invention.

FIG. 23 is a schematic side view of the first-direction movement trolley of the automatic agricultural machine according to another embodiment of the present invention.

FIG. 24 is a schematic perspective view of a first-direction rotation part of the first-direction movement trolley of the automatic agricultural machine according to another embodiment of the present invention.

FIG. 25 is a schematic plan view of the first-direction rotation part of the first-direction movement trolley of the automatic agricultural machine according to another embodiment of the present invention.

FIG. 26 is a schematic cross-sectional view of the first-direction rotation part of the first-direction movement trolley of the automatic agricultural machine according to another embodiment of the present invention.

FIG. 27 is a control flowchart of an automatic agricultural machine according to an embodiment of the present invention.

BEST MODE OF THE INVENTION

Figure 1:
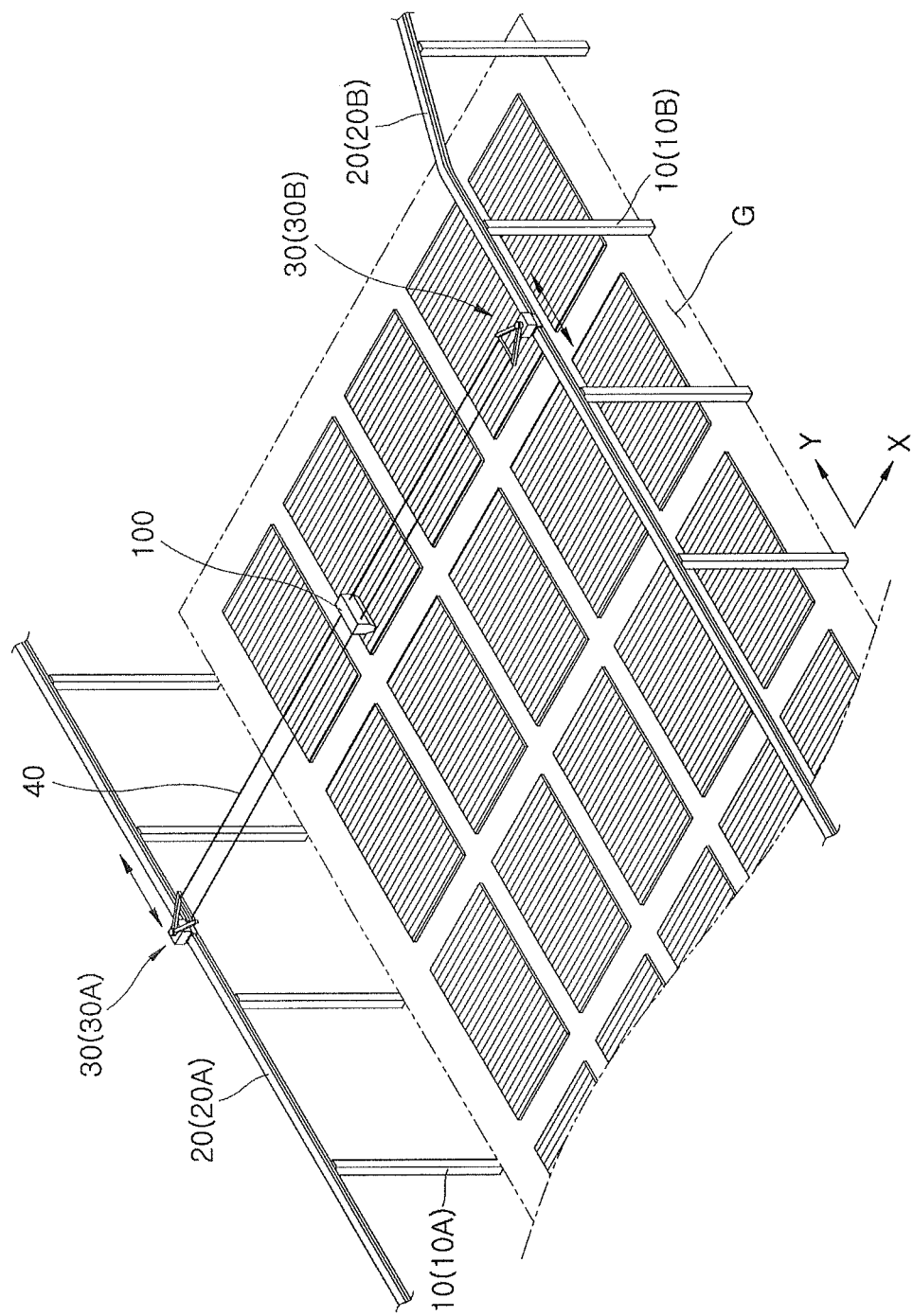
FIG. 1 is a perspective view schematically illustrating an automatic agricultural machine according to an embodiment of the present invention.

Hereinafter, an embodiment of an automatic agricultural machine according to the present invention will be described with reference to the accompanying drawings. In this process, thicknesses of lines or sizes of elements illustrated in the drawings may be exaggerated for clarity and convenience of description.

Also, terms described below are terms defined in consideration of functions in the present invention and may be changed according to an intention or a practice of a user or an operator. Therefore, such terms should be defined on the basis of the contents throughout the present specification.

Figure 2:
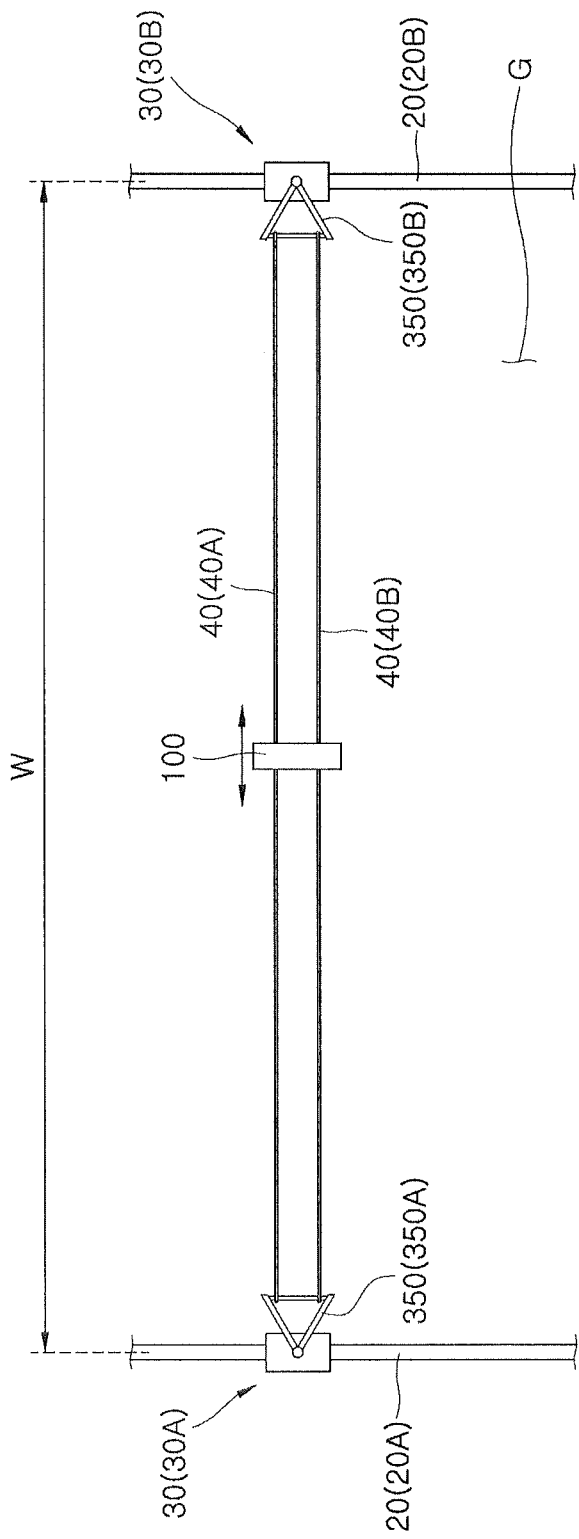
FIG. 2 is a view illustrating an operational state of the automatic agricultural machine according to an embodiment of the present invention in a state in which a width of farmland is constant.
Figure 3:
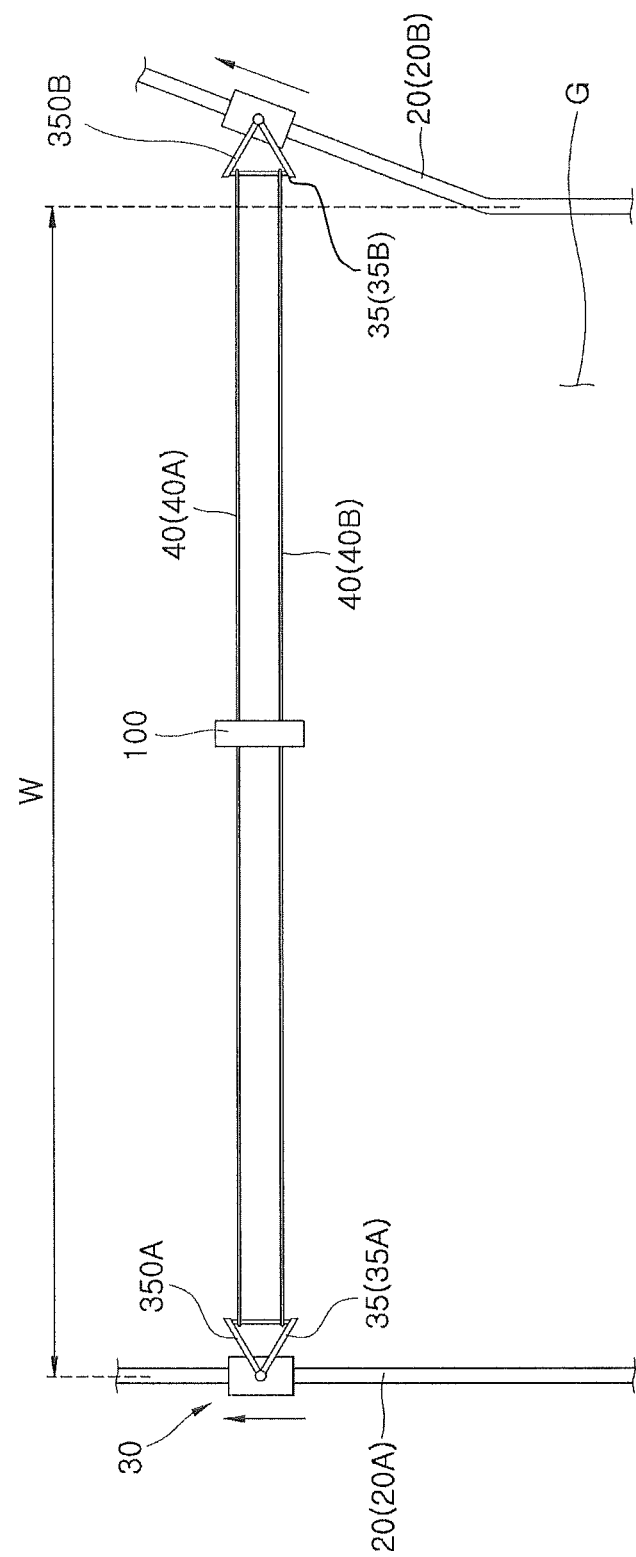
FIG. 3 is a view illustrating an operational state of the automatic agricultural machine according to an embodiment of the present invention in a state in which a width of farmland varies such that a right-side boundary expands.
Figure 4:
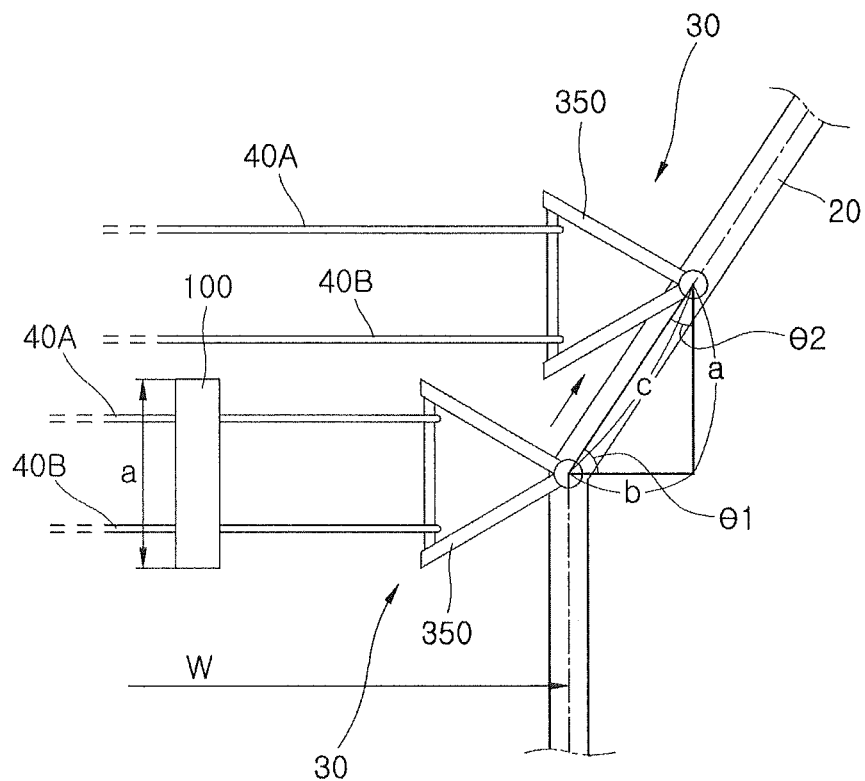
FIG. 4 is a conceptual diagram illustrating an operational state of the automatic agricultural machine according to an embodiment of the present invention.
Figure 5:
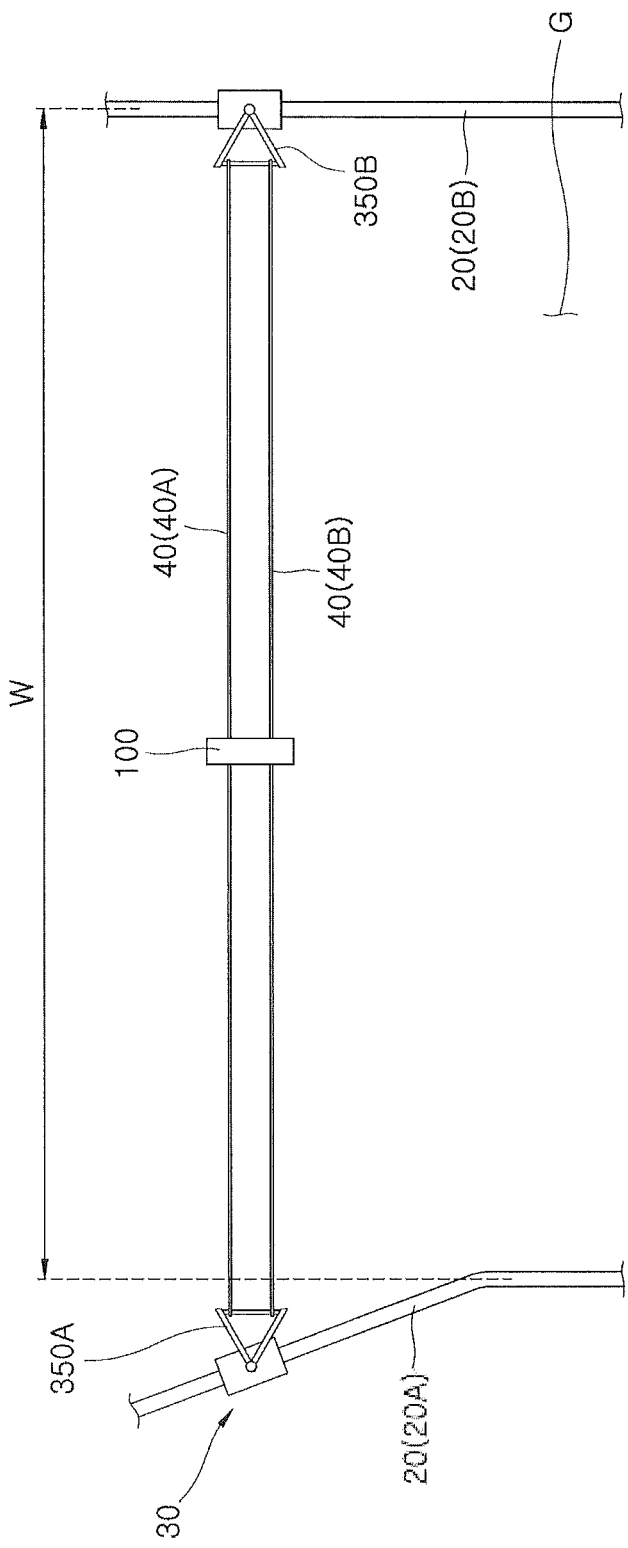
FIG. 5 is a view illustrating an operational state of the automatic agricultural machine according to an embodiment of the present invention in a state in which a width of farmland varies such that a left-side boundary expands.
Figure 6:
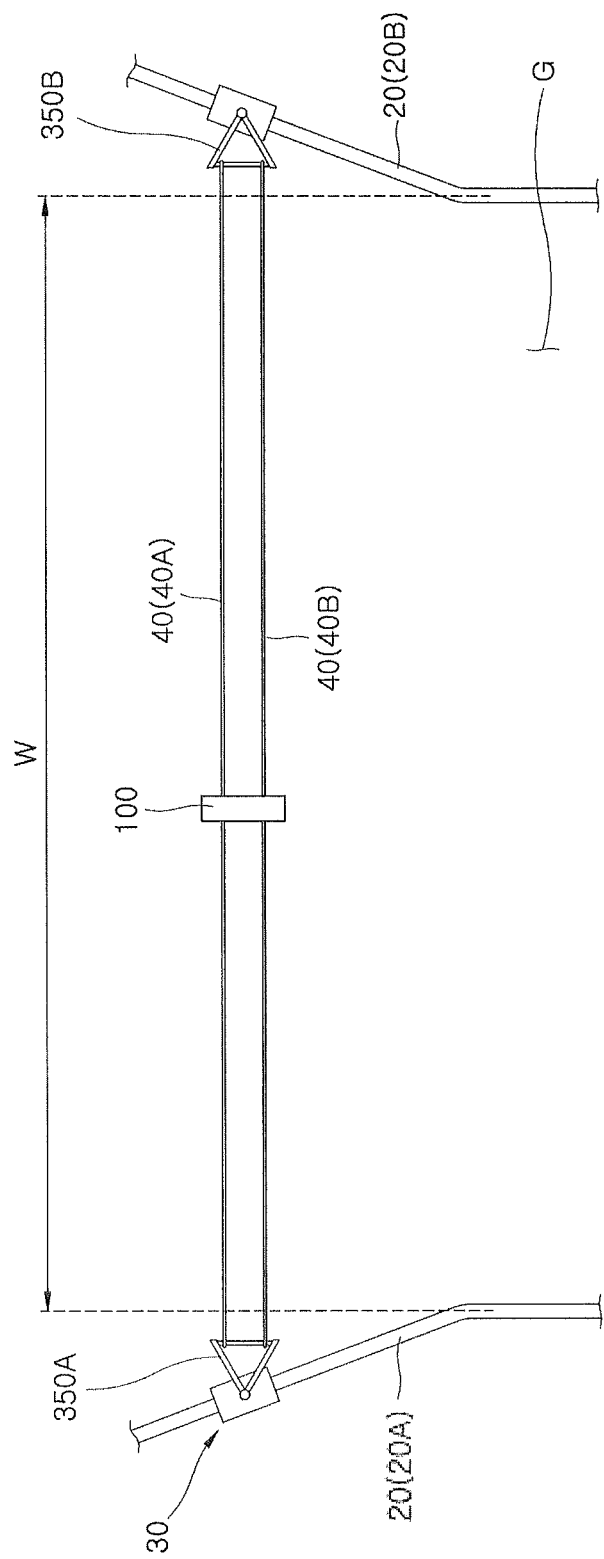
FIG. 6 is a view illustrating an operational state of the automatic agricultural machine according to an embodiment of the present invention in a state in which a width of farmland varies such that left-side and right-side boundaries expand.
Figure 7:
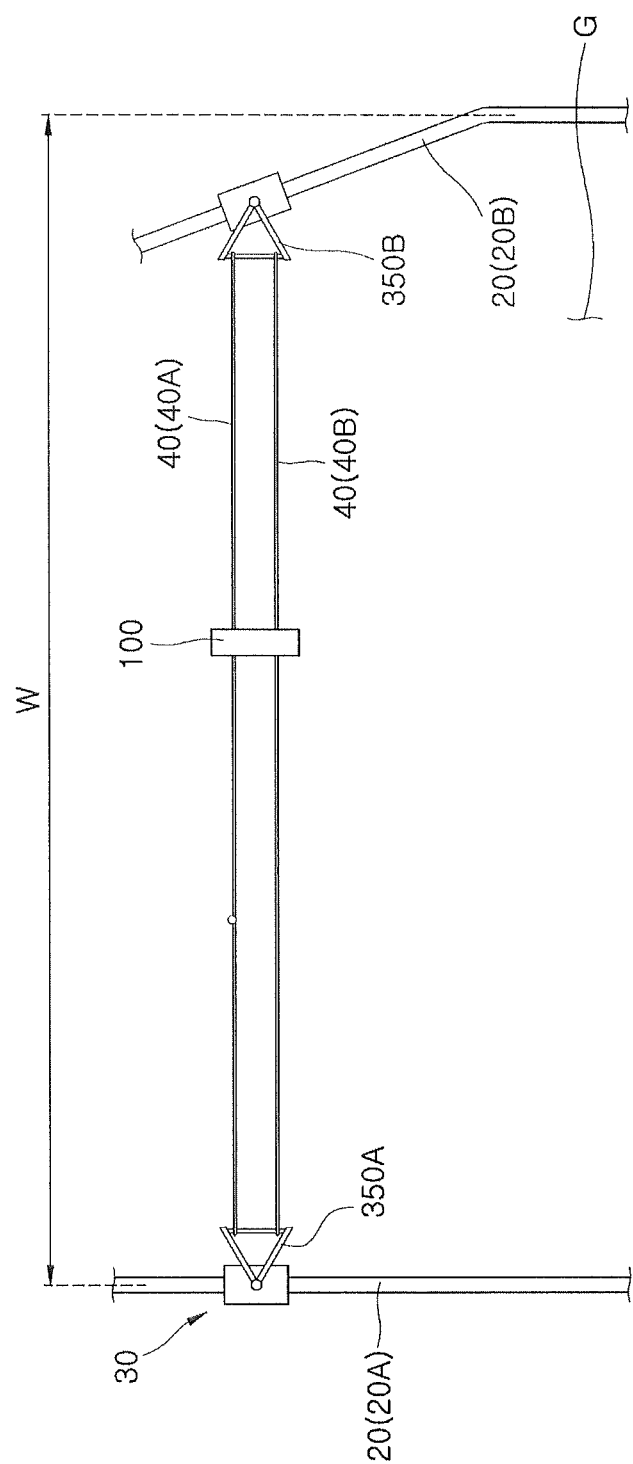
FIG. 7 is a view illustrating an operational state of the automatic agricultural machine according to an embodiment of the present invention in a state in which a width of farmland varies such that a right-side boundary becomes narrower.

FIG. 1 is a perspective view schematically illustrating an automatic agricultural machine according to an embodiment of the present invention. FIG. 2 is a view illustrating an operational state of the automatic agricultural machine according to an embodiment of the present invention in a state in which a width of farmland is constant. FIG. 3 is a view illustrating an operational state of the automatic agricultural machine according to an embodiment of the present invention in a state in which a width of farmland varies such that a right-side boundary expands. FIG. 4 is a conceptual diagram illustrating an operational state of the automatic agricultural machine according to an embodiment of the present invention. FIG. 5 is a view illustrating an operational state of the automatic agricultural machine according to an embodiment of the present invention in a state in which a width of farmland varies such that a left-side boundary expands. FIG. 6 is a view illustrating an operational state of the automatic agricultural machine according to an embodiment of the present invention in a state in which a width of farmland varies such that left-side and right-side boundaries expand. FIG. 7 is a view illustrating an operational state of the automatic agricultural machine according to an embodiment of the present invention in a state in which a width of farmland varies such that a right-side boundary becomes narrower. FIG. 8 is a front view illustrating an operational state of the automatic agricultural machine according to an embodiment of the present invention. FIGS. 9 and 10 are perspective views illustrating an automatic agricultural machine according to an embodiment of the present invention. FIG. 11 is a schematic plan view of a first-direction movement trolley according to an embodiment of the present invention. FIG. 12 is a schematic side view of the first-direction movement trolley according to an embodiment of the present invention. FIG. 13 is a schematic perspective view of a first-direction movement trolley according to an embodiment of the present invention. FIG. 14 is a schematic front view of the first-direction movement trolley according to an embodiment of the present invention. FIG. 15 is a schematic remote perspective view of the first-direction movement trolley according to an embodiment of the present invention. FIG. 16 is an enlarged view of a rotating shaft portion of the first-direction movement trolley according to an embodiment of the present invention. FIGS. 17 and 18 are enlarged views of a first-direction movement main body portion of the first-direction movement trolley according to an embodiment of the present invention. FIGS. 19 and 20 are views illustrating an automatic spraying unit according to an embodiment of the present invention. FIG. 27 is a control flowchart of an automatic agricultural machine according to an embodiment of the present invention.

Referring to FIGS. 1 to 20 and 27, the automatic agricultural machine according to an embodiment of the present invention includes a fixed base 10, a first-direction movement guide part 20, a first-direction movement trolley 30, a second-direction movement guide part 40, and an automatic spraying device 100.

The fixed base 10 is installed at boundaries of farmland G such as a paddy field or a dry field where crops are cultivated. According to the present embodiment, the fixed base 10 is formed in the shape of a pipe, and a plurality of fixed bases 10 are disposed at one-side boundary of the farmland G and the other-side boundary thereof so as to correspond to the shape of the farmland G.

A plurality of fixed bases 10A are disposed at a left-side boundary of the farmland G so as to be spaced at predetermined intervals, and a plurality of fixed bases 10B are disposed at a right-side boundary of the farmland G, which is opposite the left-side boundary, so as to be spaced at predetermined intervals.

The first-direction movement guide part 20 is installed on the plurality of fixed bases 10 so as to guide movement of the first-direction movement trolley 30 in a first direction (the Y-axis direction in FIG. 1). The first-direction movement guide part 20 may be formed in the shape of a rail but may have any other shapes as long as the first-direction movement guide part 20 is able to guide movement of the first-direction movement trolley 30.

A pair of first-direction movement guide parts 20 constitute one group and are respectively installed on the fixed bases 10A and 10B on one side and the other side.

Regarding the first-direction movement trolley 30, a pair of a first-direction movement trolley 30A on one side that is installed on a first-direction movement guide part 20A on one side and a first-direction movement trolley 30B on the other side that is installed on a first-direction movement guide part 20B on the other side constitute one group.

The pair of first-direction movement trolleys 30 may move on the first-direction movement guide parts 20 at the same speed in the same direction. Operations of the pair of first-direction movement trolleys 30 may be separately controlled so that the pair of first-direction movement trolleys 30 move on the first-direction movement guide parts 20 at different speeds or in different directions according to the shape of the farmland G.

The first-direction movement trolley 30 includes a first-direction movement main body 310 movably mounted on the first-direction movement guide part 20 and a first-direction rotation part 350 rotatably installed at a rotating shaft 355 of the first-direction movement main body 310. A wire, which serves as the second-direction movement guide part 40 configured to guide movement of the automatic spraying device 100 in the X-axis direction, is installed at each first-direction rotation part 350.

The second-direction movement guide part 40 connects the pair of first-direction movement trolleys 30 facing each other. When the first-direction movement guide part 20 is disposed in a longitudinal direction of the farmland G (the Y-axis direction), the second-direction movement guide part 40 is disposed in a width direction of the farmland G (the X-axis direction). When the farmland G has been readjusted and has a straight, quadrilateral shape, the first-direction movement guide part 20 and the second-direction movement guide part 40 may be disposed in directions orthogonal to each other.

A position of the second-direction movement guide part 40 in the Y-axis direction is designated according to positions of the pair of first-direction movement trolleys 30 disposed on the first-direction movement guide part 20. The second-direction movement guide part 40 guides movement of the automatic spraying device 100 in a second direction (the X-axis direction in FIG. 1).

The second-direction movement guide part 40 is wound around or unwound from a first-direction rotation winding part 353 installed at the first-direction rotation part 350. A predetermined tension or more should be provided to the second-direction movement guide part 40 for movement of the automatic spraying device 100 mounted on the second-direction movement guide part 40. Accordingly, the tension is adjusted by the second-direction movement guide part 40 being wound around or unwound from the first-direction rotation winding part 353 corresponding to an interval between the pair of first-direction movement trolleys 30.

When a right-side boundary of the farmland G expands as illustrated in FIG. 3, the second-direction movement guide part 40 is not wound or unwound at a first-direction rotation part 350A on the left side, but the second-direction movement guide part 40 is unwound at a first-direction rotation part 350B on the right side so that tension of the second-direction movement guide part 40 is maintained to be constant.

When a left-side boundary of the farmland G expands as illustrated in FIG. 5, the second-direction movement guide part 40 is not wound or unwound at the first-direction rotation part 350B on the right side, but the second-direction movement guide part 40 is unwound at the first-direction rotation part 350A on the left side so that tension of the second-direction movement guide part 40 is maintained to be constant.

In this way, at the pair of first-direction rotation parts 350A and 350B, the operation of winding or unwinding the second-direction movement guide part 40 is separately controlled according to a change in a boundary of the farmland G. In the present embodiment, at the first-direction rotation parts 350A and 350B, the operation of winding or unwinding the second-direction movement guide part 40 is controlled at the side of the farmland G where a change in a boundary occurs.

The first-direction rotation part 350 increases the overall length of the second-direction movement guide part 40 by an increased interval between the pair of first-direction movement trolleys 30A and 30B as the width of the farmland G is changed. Conversely, when the interval between the pair of first-direction movement trolleys 30A and 30B is decreased, the second-direction movement guide part 40 is wound around the first-direction rotation winding part 353, and the overall length of the second-direction movement guide part 40 is decreased.

The second-direction movement guide part 40 may be formed in the shape of a wire but may have any other shapes as long as the second-direction movement guide part 40 is able to guide movement of the automatic spraying device 100. In the present embodiment, the second-direction movement guide part 40 is formed of two wires.

The automatic spraying device 100 may be installed on the second-direction movement guide part 40, and, by including a separate driving part, the automatic spraying device 100 may move on the second-direction movement guide part 40 by its own power source.

In the present embodiment, the pair of first-direction movement trolleys 30A and 30B may be moved the same distance in the Y-axis direction. When a unit spraying distance of the automatic spraying device 100 is a (see FIG. 4), once spraying on any one area is completed, the pair of first-direction movement trolleys 30A and 30B move the unit spraying distance a in the Y-axis direction and perform spraying on the next area of the farmland G.

A unit movement distance of the first-direction movement trolleys 30 in the Y-axis direction may be set to be larger or smaller than the unit spraying distance a. That is, when the first-direction movement trolleys 30 are set to move a distance of a/2 in the Y-axis direction per time, a rear portion of a previous spraying area and a front portion of a subsequent spraying area overlap.

In this way, the unit movement distance of the first-direction movement trolleys 30 in the Y-axis direction may be adjusted due to various reasons such as the use environment, concentration of pesticides and the like, type of pesticides and the like, shape of a spraying nozzle, a width of a spraying area, and widths of ridges and furrows.

As described above, the unit movement distance of the first-direction movement trolleys 30 in the Y-axis direction may be set as a, set as 2a, 3a, . . . Na (where N is a natural number), set as 2/a, or set as 3/a, 4/a, . . . N/a (where N is a natural number). In this way, the unit movement distance of the first-direction movement trolleys 30 in the Y-axis direction may be adjusted according to the shape of the farmland G.

When the shape of the farmland G is unchanged as illustrated in FIG. 1, once spraying in one area is completed, the pair of first-direction movement trolleys 30A and 30B on the left and right sides move the unit spraying distance a in the Y-axis direction and move to the next area.

When the width of the farmland G varies such that the right-side boundary expands or becomes narrower or the left-side and right-side boundaries expand or become narrower, the automatic spraying device 100 is moved as follows.

Referring to FIGS. 2 to 7, once spraying in any one area is completed, the first-direction movement trolley 30 at a side where a change does not occur in the shape of a boundary of the farmland G (the right side in FIG. 3, the left side in FIG. 5, or the like) of the pair of first-direction movement trolleys 30 moves the unit spraying distance a in the Y-axis direction.

A movement distance of the first-direction movement trolley 30 at a side where a change occurs in the shape of a boundary of the farmland G as the boundary expands or becomes narrower (the left side in FIG. 3, the right side in FIG. 5, or the like) is c, which is larger than the unit spraying distance a. That is, the distance that the first-direction movement trolley 30, which is at the side where a change occurs in the shape of the boundary of the farmland G when the boundary expands or becomes narrower, moves to perform spraying on the next area, i.e., the unit movement distance, is larger than the unit spraying distance a.

Referring to FIG. 4, the distance c that the first-direction movement trolley 30 will actually move may be obtained on the basis of the unit spraying distance a and a X-axis direction movement distance of the first-direction movement trolley 30 due to a change in the boundary of the farmland G.

Here, the distance c that the first-direction movement trolley 30 will actually move may be set by the Pythagorean theorem. That is, the square of the distance c that the first-direction movement trolley 30 will actually move may be set as the sum of the square of the unit spraying distance a and the square of a movement distance b of the first-direction movement trolley 30 in the X-axis direction.

When the boundary of the farmland G is changed as shown in FIG. 4, the first-direction movement trolley 30 should move the movement distance b, which corresponds to a change in the width of the farmland G, in the X-axis direction in order to move the unit spraying distance a in the Y-axis direction.

Therefore, when the distance that the first-direction movement trolley 30 actually moves is a instead of c, the distance that the first-direction movement trolley 30 moves in the Y-axis direction is less than a.

Accordingly, the first-direction movement trolley 30 at the side where a change does not occur in the boundary of the farmland G and the first-direction movement trolley 30 at the side where a change occurs in the boundary of the farmland G are not necessarily spaced at the same distance from the origin on the Y-axis.

That is, areas in which pesticides are sprayed by the automatic spraying device 100 may overlap with each other as the first-direction movement trolley 30 at the side where a change occurs in the boundary of the farmland G moves a shorter distance along the Y-axis than the first-direction movement trolley 30 at the side where a change does not occur in the boundary of the farmland G. This may increase the amount of sprayed pesticides and cause various side effects.

More specifically, once spraying on any one area is completed, the pair of first-direction movement trolleys 30 should move by the unit spraying distance a along the Y-axis in order to prevent the previous spraying area and the current spraying area from overlapping each other. However, when the movement distance along the Y-axis is decreased, overlapping may occur between the spraying areas, and pesticides may be excessively sprayed on a certain spot. Also, conversely, when the movement distance along the Y-axis is increased, pesticides may not be sprayed on some areas, and the effect of spraying pesticides may not be obtained.

Since the first-direction rotation part 350 is mounted on the first-direction movement main body 310 so as to be rotatable by a rotating shaft, even when the first-direction movement main body 310 is moved to be inclined leftward or rightward according to a change in the boundary of the farmland G, an angle of the first-direction rotation part 350 is automatically adjusted by the rotating shaft, and the first-direction rotation part 350 adjusts the position of the second-direction movement guide part 40.

When the unit movement distance of the first-direction movement trolley 30 is a and θ1 or θ2 is known in FIG. 4, by a trigonometric formula, a controller 700 may calculate b, which is an amount of increase of the second-direction movement guide part 40. Accordingly, operation of the second-direction movement guide part 40 is controlled so that the second-direction movement guide part 40 is unwound as much as b. Likewise, by the trigonometric formula, the controller 700 may calculate c, which is the actual distance the first-direction movement trolley 30 will move.

Therefore, when the first-direction movement trolley 30 moves the distance c in N stages on the first-direction movement guide part 20, the second-direction movement guide part 40 is unwound by b in N stages, and, accordingly, a length of a second-direction movement guide part 40A on one side and a length of a second-direction movement guide part 40B on the other side may remain the same as each other.

Since the length of the second-direction movement guide part 40A on the one side and the length of the second-direction movement guide part 40B on the other side remain the same as each other by the above-described structure while the automatic spraying device 100 sprays pesticides all over the farmland G, a worker may spray a desired amount of pesticides through the automatic spraying device 100.

Also, a situation in which pesticides are not sprayed or excessively sprayed in a specific area of the farmland G may be prevented, and the automatic spraying device 100 may stably move on the second-direction movement guide part 40.

The angles θ1 and θ2 may be changed several times while the first-direction movement trolley 30 moves a unit movement distance, that is, a distance traveled along the Y-axis for spraying on the next area. Here, the controller 700 may secure coordinates of points at which the angles θ1 and θ2 remain unchanged on a path on the first-direction movement guide part 20, along which the first-direction movement trolley 30 will move, and may calculate a distance to be traveled by the first-direction movement trolley 30 in the X-axis direction and a distance to be traveled by the first-direction movement trolley 30 in the Y-axis direction by using the secured coordinates and coordinates of the current point. Here, the distance to be traveled in the X-axis direction becomes a parameter for adjusting the winding amount or unwinding amount of the second-direction movement guide part 40.

In this way, even when the angles θ1 and θ2 continuously change, the controller 700 may extract coordinates of the current point and a point predicted to be reached and may calculate values of b and c on the basis of a trigonometric formula in real time. Accordingly, overall control of the automatic agricultural machine, including movement control of the first-direction movement trolley 30 and winding control, is possible.

Meanwhile, among various possible changes in the boundary of the farmland G, a case in which the width of the farmland G expands has been described above with reference to FIG. 4. The present invention may identically apply to a case in which, contrary to the above-described case, the width of the farmland G becomes narrower.

The controller 700 may include a position measurement sensor 710. The position measurement sensor 710 may measure coordinates of the current point at which the automatic spraying device 100 is present and a point to be reached by the first-direction movement trolley 30. The position measurement sensor 710 may include a Global Positioning System (GPS).

Therefore, since coordinates of a point to be reached by the first-direction movement trolley 30 may be measured in advance by the position measurement sensor 710, the winding amount or unwinding amount of the second-direction movement guide part 40 may be adjusted at the first-direction movement trolley 30 in real time so that the lengths of the pair of second-direction movement guide parts 40A and 40B remain the same as each other.

The controller 700 may include a memory part 720. The memory part 720 stores information on movement of the first-direction movement trolley 30 that traveled along the entire first-direction movement guide part 20 before pesticides are sprayed, coordinates of each point, and the like. Therefore, the controller 700 may adjust the winding amount or unwinding amount of the second-direction movement guide part 40 at each point of the first-direction movement trolley 30 in real time on the basis of various pieces of information provided from the memory part 720.

The automatic agricultural machine further includes a support base 110 configured to support the second-direction movement guide part 40. The support base 110 may be formed to be longer than a distance between the second-direction movement guide part 40 and the ground of the farmland G.

As the support base 110 supports the second-direction movement guide part 40 and holds the second-direction movement guide part 40, vibration of the second-direction movement guide part 40 that occurs due to wind or other external environmental factors may be suppressed.

Accordingly, it is possible to suppress shaking of the automatic spraying device 100 that moves on the second-direction movement guide part 40 and sprays pesticides, water, insecticides, herbicides, fertilizers, disinfectants, bactericides, acaricides, nematicides, growth regulators, attractants, repellents, spreading agents, pest control solutions, drugs, medicinal fluids, chemicals, liquids or the like and, further, the spraying range and spray amount of pesticides, water, or the like may be uniformly controlled in several areas.

The support base 110 may have a wheel mounted on a lower portion thereof so as to be movable on the ground of the farmland G. The support base 110 is installed to support the second-direction movement guide part 40 but not interfere with movement of the automatic spraying device 100.

The automatic spraying device 100 includes an automatic spraying unit 150. A relative distance between the automatic spraying unit 150 and the second-direction movement guide part 40 may be adjusted so that a distance between the automatic spraying unit 150 and the ground of the farmland G is maintained constant. That is, when the second-direction movement guide part 40 sags downward due to its own weight or the like, the automatic spraying unit 150 rises in a direction moving away from the second-direction movement guide part 40 so that the distance between the automatic spraying unit 150 and the ground of the farmland G is maintained.

To this end, the automatic spraying unit 150 is connected by a variable-length part 140 to a movement main body 120 which is able to move in a horizontal direction on a rack gear part 115 of an automatic spraying trolley 110 that moves on the second-direction movement guide part 40.

In the present embodiment, the movement main body 120 is provided as four movement main bodies 120. Therefore, the variable-length part 140 is also provided as four variable-length parts 140, each movement main body 120 is coupled to one of the variable-length parts 140, and the four variable length parts 140 support the automatic spraying unit 150 at four spots.

A cog wheel part 121 of the movement main body 120 is installed to be movable on the rack gear part 115, and a height of the automatic spraying unit 150 is adjusted according to an interval between a pair of cog wheel parts 121 facing each other which are disposed on the same rack gear part 115. Specifically, the automatic spraying unit 150 rises when the interval between the pair of cog wheel parts 121 facing each other decreases and falls when the interval between the pair of cog wheel parts 121 increases.

The automatic spraying trolley 110 includes a wheel part 105, and the wheel part 105 rotates and moves on the second-direction movement guide part 40. In the present embodiment, a total of four wheel parts 105 are provided such that two wheel parts 105 are disposed at the second-direction movement guide part 40A on the one side, and the remaining two wheel parts 105 are disposed at the second-direction movement guide part 40B on the other side so as to be parallel to the other two wheel parts 105. The wheel parts 105 allow the automatic spraying trolley 110 to smoothly move on the second-direction movement guide part 40.

The automatic spraying unit 150 is connected to a pesticide supply hose 500 to receive pesticides and sprays the pesticides through a pesticide spray nozzle 155.

The automatic spraying device 100 may be connected to a power line 600. Since power is supplied from the outside through the power line 600, the automatic spraying trolley 110, the movement main body 120, the variable-length part 140, the automatic spraying unit 150, and the like may be operated.

Meanwhile, specific units of the automatic spraying device 100 including the automatic spraying trolley 110, the movement main body 120, the variable-length part 140, and the automatic spraying unit 150 may also be operated through a separate power supply source, e.g., a battery.

The second-direction movement guide part 40 may be made of a material that does not stretch. That is, the second-direction movement guide part 40 may sag toward the ground due to the weight or the like of the automatic spraying device 100 as the automatic spraying device 100 is installed.

In this case, since it may be difficult to adjust the spraying range and spray amount of pesticides or the like, before installing the second-direction movement guide part 40, the second-direction movement guide part 40 may be stretched in advance with a separate machine until a rupture threshold value is reached so that sagging of the second-direction movement guide part 40 is prevented from occurring when the second-direction movement guide part 40 is installed in the future. In addition to the support base 110, a separate weighting device such as a weight may also be mounted on the second-direction movement guide part 40.

The pair of second-direction movement guide parts 40A and 40B may be connected by a connection line 650 configured to connect therebetween.

An automatic insecticidal device, an automatic surveillance camera, an automatic sterilization device, an automatic sowing device, or the like may be applied in place of the automatic spraying device 100. Like the automatic spraying device 100, the automatic insecticidal device may move on the second-direction movement guide part 40 and eradicate pests or the like that live across the farmland G. Like the automatic spraying device 100, the automatic surveillance camera may cover the whole area of the farmland G and thus detect the growth of crops and other environmental change factors that occur in the farmland G in real time.

The principle of the automatic agricultural machine 100 of the present invention may also be applied to an automatic movement system. While the automatic agricultural machine 100 moves on the farmland G and performs agricultural work, the automatic movement system is a system that automatically moves on a target area other than the farmland G and performs work set by a worker. Since the automatic movement system may also move as intended by a worker on irregular areas as well as regular areas which have a straight, quadrilateral shape, the work set by the worker may be thoroughly performed on the target area.

FIGS. 21 and 22 are schematic perspective views of a first-direction movement trolley of an automatic agricultural machine according to another embodiment of the present invention. FIG. 23 is a schematic side view of the first-direction movement trolley of the automatic agricultural machine according to another embodiment of the present invention. FIG. 24 is a schematic perspective view of a first-direction rotation part of the first-direction movement trolley of the automatic agricultural machine according to another embodiment of the present invention. FIG. 25 is a schematic plan view of the first-direction rotation part of the first-direction movement trolley of the automatic agricultural machine according to another embodiment of the present invention. FIG. 26 is a schematic cross-sectional view of the first-direction rotation part of the first-direction movement trolley of the automatic agricultural machine according to another embodiment of the present invention.

As illustrated in FIGS. 21 to 26, a first-direction movement trolley 30 of the automatic agricultural machine according to another embodiment of the present invention includes a first-direction movement main body 310 movably mounted on a first-direction movement guide part 20 and a first-direction rotation part 350 rotatably installed on the first-direction movement main body 310.

Among the contents relating to the automatic agricultural machine according to another embodiment of the present invention, descriptions of contents identical to those relating to the automatic agricultural machine according to the above-described embodiment of the present invention will be omitted.

A wire, which serves as a second-direction movement guide part 40 configured to guide movement of an automatic spraying device 100 in the X-axis direction, is installed on each first-direction rotation part 350.

When a controller 700 operates a first-direction rotation winding part 353, the wire, which serves as the second-direction movement guide part 40, is wound around the first-direction rotation winding part 353 or unwound therefrom and tightly pulled, and the first-direction rotation part 350 rotates about a rotating shaft 355.

The first-direction movement main body 310 includes a first-direction movement part 311, a first-direction motor part 313, a first-direction movement wheel part 315, and a first-direction bearing part 317.

The first-direction movement part 311 is movably mounted on the first-direction movement guide part 20. The first-direction motor part 313 is mounted on the first-direction movement part 311. The first-direction motor part 313 is axially connected to the first-direction movement wheel part 315 and rotates the first-direction movement wheel part 315.

The first-direction movement wheel part 315 is engaged with a cog wheel part 21 formed on a side surface of the first-direction movement guide part 20. An outer side surface of the first-direction movement wheel part 315 is formed to be able to be engaged with the cog wheel part 21. The cog wheel part 21 may be formed on a side surface of the first-direction movement guide part 20 and formed in the shape of a groove or the shape of a gear that corresponds to a gear of the first-direction movement wheel part 315.

The first-direction movement wheel part 315 is rotated due to operation of the first-direction motor part 313. As the first-direction movement wheel part 315 is engaged with the cog wheel part 21, the first-direction movement wheel part 315 is moved along the first-direction movement guide part 20.

The first-direction bearing part 317 is mounted on the first-direction movement part 311. The first-direction bearing part 317 supports a load of the first-direction movement part 311 which is moved on the first-direction movement guide part 20.

The first-direction rotation part 350 includes a first-direction rotation body part 351, the first-direction rotation winding part 353, and the rotating shaft 355.

The first-direction rotation body part 351 is installed on the first-direction movement part 311 of the first-direction movement main body 310 so as to be rotatable by the rotating shaft 355. The first-direction rotation body part 351 accommodates the first-direction rotation winding part 353 in an inner space thereof.

The first-direction rotation winding part 353 is rotatably installed on the first-direction movement part 311. The first-direction rotation winding part 353 is connected to the second-direction movement guide part 40 and winds or unwinds the second-direction movement guide part 40. The first-direction rotation winding part 353 unwinds the second-direction movement guide part 40 when a boundary of farmland G expands and winds the second-direction movement guide part 40 when the boundary of the farmland G becomes narrower, thereby maintaining the tension of the second-direction movement guide part 40 to be constant.

The rotating shaft 355 is a center-of-rotation part that is installed on the first-direction movement part 311 and passes through the first-direction rotation body part 351 to rotatably support the first-direction rotation body part 351.

The first-direction rotation winding part 353 is provided as a plurality of first-direction rotation winding parts 353. In the present embodiment, three first-direction rotation winding parts 353A, 353B, and 353C are provided. The second-direction movement guide part 40 may be wound around the first-direction rotation winding part 353A, a power line 600 may be wound around the first-direction rotation winding part 353B, and a pesticide supply hose 500 may be wound around the first-direction rotation winding part 353C. Also, the second-direction movement guide part 40 on one side may be wound around the first-direction rotation winding part 353A, the second-direction movement guide part 40 on the other side may be wound around the first-direction rotation winding part 353B, and each of the pesticide supply hose 500 and the power line 600 may be wound around the first-direction rotation winding part 353C. The objects wound around each of the plurality of first-direction rotation winding parts 353A, 353B, and 353C may be changed according to the shape and size of the first-direction rotation body part 351 or according to a set tension range or the like of the second-direction movement guide part 40, the pesticide supply hose 500, and the power line 600.

The first-direction rotation part 350 may further include first-direction rotation roller parts 358 and 359. A plurality of the first-direction rotation roller parts 358 and 359 are rotatably installed on the first-direction rotation body part 351. Each of the first-direction rotation roller parts 358 and 359 may be formed of an idle roller that rotates on the first-direction rotation body part 351.

The first-direction rotation roller parts 358 and 359 wind the second-direction movement guide part 40 and prevent twisting or the like of the second-direction movement guide part 40. Winding or unwinding of the second-direction movement guide part 40 is guided by the first-direction rotation roller parts 358 and 359.

In the present invention, a limiter switch part 357 is further included. The limiter switch part 357 is installed at the first-direction rotation roller parts 358 and 359 and, when tension of the second-direction movement guide part 40 being wound or unwound deviates from a set range, detects the deviation and transmits the detected information to a controller 700. On the basis of the transmitted information, the controller 700 may stop operations of the first-direction rotation roller parts 358 and 359 and the first-direction rotation winding part 353. Meanwhile, the controller 700 may operate the winding first-direction rotation winding part 353 in a direction of unwinding or operate the unwinding first-direction rotation winding part 353 in a direction of winding. When the tension of the second-direction movement guide part 40 deviates from a set range, the controller 700 may operate an alarm part or a display part to inform the worker of the deviation.

The present invention has been described above with reference to the embodiments illustrated in the drawings, but the embodiments are merely illustrative, and those of ordinary skill in the art should understand that various modifications and other equivalent embodiments are possible from the above-described embodiments. Therefore, the actual technical scope of the present invention should be defined by the claims below.

The invention claimed is:

1. An automatic agricultural machine comprising:

fixed bases disposed on farmland;

two or more first-direction movement guide parts installed on the fixed bases so as to be spaced apart from the farmland and disposed to be spaced apart from each other;

first-direction movement trolleys each configured to travel on one of the first-direction movement guide parts; and an automatic spraying device configured to travel on second-direction movement guide parts each connected to one of the first-direction movement trolleys, wherein traveling control of the first-direction movement trolleys and winding control of the second-direction movement guide parts are performed on the basis of at least any one of the trigonometric function principle and the Pythagorean theorem, wherein the first-direction movement trolley includes:

a first-direction movement main body movably mounted on the first-direction movement guide part; and a first-direction rotation part rotatably installed on a rotating shaft of the first-direction movement main body and to which the second-direction movement guide part is connected.

2. The automatic agricultural machine of claim 1, wherein tension is adjusted by the second-direction movement guide part being wound around or unwound from a first-direction rotation winding part installed on the first-direction rotation part.

3. The automatic agricultural machine of claim 1, further comprising a position measurement sensor configured to measure coordinates of a current point at which the automatic spraying device is present and a point to be reached by the first-direction movement trolley, wherein a controller adjusts a winding amount or an unwinding amount of the second-direction movement guide part at the first-direction movement trolley so that lengths of a pair of second-direction movement guide parts remain the same as each other.

4. The automatic agricultural machine of claim 1, further comprising a memory part configured to store pieces of information including information on movement of the first-direction movement trolley that travels along the entire first-direction movement guide part before pesticides are sprayed and coordinates of each point, wherein a controller adjusts a winding amount or an unwinding amount of the second-direction movement guide part at each point of the first-direction movement trolley on the basis of the pieces of information provided from the memory part.

5. The automatic agricultural machine of claim 1, further comprising a support base configured to support the second-direction movement guide part, wherein the support base is formed to be longer than a distance between the second-direction movement guide part and ground of the farmland.

6. An automatic agricultural machine comprising:

fixed bases disposed on farmland;

two or more first-direction movement guide parts installed on the fixed bases so as to be spaced apart from the farmland and disposed to be spaced apart from each other;

first-direction movement trolleys each configured to travel on one of the first-direction movement guide parts; and an automatic spraying device configured to travel on second-direction movement guide parts each connected to one of the first-direction movement trolleys, wherein:

traveling control of the first-direction movement trolleys and winding control of the second-direction movement guide parts are performed on the basis of at least any one of the trigonometric function principle and the Pythagorean theorem, the automatic spraying device includes an automatic spraying unit of which a relative distance from the second-direction movement guide part is adjusted so that a distance between the automatic spraying unit and ground of the farmland is maintained to be constant; and the automatic spraying unit sprays pesticides supplied by a pesticide supply hose through a pesticide spray nozzle and is connected by a variable-length part to a movement main body which is able to move in a horizontal direction on a rack gear part of an automatic spraying trolley that moves on the second-direction movement guide part.

7. An automatic agricultural machine comprising:
fixed bases disposed on farmland;
two or more first-direction movement guide parts installed on the fixed bases so as to be spaced apart from the farmland and disposed to be spaced apart from each other;
first-direction movement trolleys each configured to travel on one of the first-direction movement guide parts; and
an automatic spraying device configured to travel on second-direction movement guide parts each connected to one of the first-direction movement trolleys,
wherein:
traveling control of the first-direction movement trolleys and winding control of the second-direction movement guide parts are performed on the basis of at least any one of the trigonometric function principle and the Pythagorean theorem,
a pair of the first-direction movement guide parts constitute one group and are respectively installed on the fixed bases on one side and the other side; and
regarding the first-direction movement trolleys, a pair of a first-direction movement trolley on one side that is installed on the first-direction movement guide part on one side and a first-direction movement trolley on the other side that is installed on the first-direction movement guide part on the other side constitute one group.

* * * * *